US011218429B2

(12) United States Patent
Yun et al.

(10) Patent No.: US 11,218,429 B2
(45) Date of Patent: Jan. 4, 2022

(54) ELECTRONIC DEVICE AND METHOD FOR CHANGING CHATBOT

(71) Applicant: Samsung Electronics Co., Ltd., Suwon-si (KR)

(72) Inventors: Ji-hwan Yun, Suwon-si (KR); Won-ho Ryu, Suwon-si (KR); Won-jong Choi, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/173,467

(22) Filed: Oct. 29, 2018

(65) Prior Publication Data

US 2019/0158433 A1    May 23, 2019

(30) Foreign Application Priority Data

Nov. 20, 2017  (KR) .................. 10-2017-0154939

(51) Int. Cl.
*H04L 12/58* (2006.01)
*G10L 15/06* (2013.01)
(Continued)

(52) U.S. Cl.
CPC .............. *H04L 51/02* (2013.01); *G06F 3/167* (2013.01); *G06F 40/205* (2020.01);
(Continued)

(58) Field of Classification Search
CPC ..... H04L 51/02; H04L 51/16; G06F 17/2705; G06F 17/2765; G06F 3/167; G10L 15/02;
(Continued)

(56) References Cited

U.S. PATENT DOCUMENTS 8,739,272 B1 *   5/2014   Cooper ............... H04L 63/0245
                                                      726/13
9,823,811 B2 *  11/2017   Brown ................. G06F 3/04817
(Continued)

FOREIGN PATENT DOCUMENTS

CN          100518070 C        7/2009
JP           4370410 B2       11/2009
(Continued)

OTHER PUBLICATIONS

International Search Report dated Feb. 15, 2019, issued in International Application No. PCT/KR2018/013061.
(Continued)

*Primary Examiner* — Benjamin M Thieu
(74) *Attorney, Agent, or Firm* — Jefferson IP Law, LLP

(57) ABSTRACT

An artificial intelligence (AI) system which utilizes machine learning algorithm such as deep learning and application is provided. The artificial intelligence (AI) system includes a controlling method of an electronic device for determining a chatbot using an artificial intelligence learning model includes receiving a voice uttered by a user, processing the voice and acquiring text information corresponding to the voice, and displaying the text information on a chat screen, determining a chatbot for providing a response message regarding the voice by inputting the acquired text information and chat history information regarding the chat screen to a model which is trained to determine the chatbot by inputting text information and chat history information, transmitting the acquired text information and the chat history information regarding the chat screen to a server for providing the determined chatbot, and receiving a response message from the server and displaying the response message on the chat screen.

16 Claims, 20 Drawing Sheets

(51) Int. Cl.
  *G10L 17/22* (2013.01)
  *G10L 15/02* (2006.01)
  *G06F 3/16* (2006.01)
  *G06F 40/205* (2020.01)
  *G06F 40/279* (2020.01)
  *G10L 15/26* (2006.01)

(52) U.S. Cl.
  CPC ............ *G06F 40/279* (2020.01); *G10L 15/02* (2013.01); *G10L 15/063* (2013.01); *G10L 15/26* (2013.01); *G10L 17/22* (2013.01)

(58) Field of Classification Search
  CPC ..... G10L 15/063; G10L 15/265; G10L 17/22; G10L 15/26; G06Q 50/20; G06Q 10/10; G06Q 30/016
  See application file for complete search history.

(56) References Cited

U.S. PATENT DOCUMENTS

| | | | |
|---|---|---|---|
| 10,417,567 B1* | 9/2019 | Miller | G06N 3/006 |
| 10,469,665 B1* | 11/2019 | Bell | H04L 67/22 |
| 10,581,761 B2* | 3/2020 | Kamble | H04L 49/256 |
| 10,581,765 B2* | 3/2020 | Koukoumidis | G06F 16/951 |
| 10,681,212 B2* | 6/2020 | Sanghavi | H04L 51/046 |
| 10,809,876 B2* | 10/2020 | Brown | G06F 9/453 |
| 2011/0078105 A1 | 3/2011 | Wallace | |
| 2012/0265528 A1* | 10/2012 | Gruber | G10L 15/183 704/235 |
| 2014/0122619 A1 | 5/2014 | Duan | |
| 2015/0185996 A1* | 7/2015 | Brown | G06F 3/04817 715/706 |
| 2016/0300570 A1 | 10/2016 | Gustafson et al. | |
| 2017/0048170 A1* | 2/2017 | Smullen | H04L 67/02 |
| 2017/0180276 A1 | 6/2017 | Gershony et al. | |
| 2017/0180284 A1* | 6/2017 | Smullen | H04L 69/14 |
| 2017/0230312 A1* | 8/2017 | Barrett | H04L 51/046 |
| 2017/0293834 A1* | 10/2017 | Raison | G06F 40/40 |
| 2017/0295114 A1* | 10/2017 | Goldberg | G06N 20/00 |
| 2017/0324868 A1 | 11/2017 | Tamblyn et al. | |
| 2018/0025726 A1* | 1/2018 | Gatti de Bayser | G10L 15/22 704/257 |
| 2018/0096686 A1* | 4/2018 | Borsutsky | H04L 51/02 |
| 2018/0131645 A1* | 5/2018 | Magliozzi | H04L 51/02 |
| 2018/0181558 A1* | 6/2018 | Emery | H04M 3/4936 |
| 2018/0365212 A1* | 12/2018 | Banerjee | G06F 17/279 |
| 2018/0367480 A1* | 12/2018 | Housman | G06N 20/00 |
| 2019/0036849 A1* | 1/2019 | Uppala | G06F 16/24578 |
| 2019/0068527 A1* | 2/2019 | Chen | H04L 51/02 |
| 2019/0109803 A1* | 4/2019 | Akkiraju | G09B 19/00 |
| 2019/0140986 A1* | 5/2019 | Anderson | G10L 15/22 |
| 2019/0173811 A1* | 6/2019 | Estrada | H04L 51/38 |

FOREIGN PATENT DOCUMENTS

| | | |
|---|---|---|
| KR | 10-2008-0075748 A | 8/2008 |
| KR | 10-2015-0037804 A | 4/2015 |
| KR | 10-1731867 B1 | 5/2017 |

OTHER PUBLICATIONS

European Office Action dated Jul. 15, 2020, issued in European Application No. 18879732.

* cited by examiner (a)　　　　　(b)

(c)　　　　　(d)

(a)  (b)

(c)  (d)

(a)

(b)

ELECTRONIC DEVICE AND METHOD FOR CHANGING CHATBOT

CROSS-REFERENCE TO RELATED APPLICATION(S)

This application is based on and claims priority under 35 U.S.C. § 119(a) of a Korean patent application number 10-2017-0154939, filed on Nov. 20, 2017, in the Korean Intellectual Property Office, the disclosure of which is incorporated by reference herein in its entirety.

BACKGROUND

1. Field

The disclosure relates to an electronic device and a control method thereof. More particularly, the disclosure relates to an electronic device and a control method thereof that can determine a chatbot based on text information corresponding to voice and a chat history on a chat screen.

In addition, the disclosure relates to an artificial intelligence (AI) system and an application thereof that simulates functions such as recognition and judgment of a human brain using a machine learning algorithm.

2. Description of Related Art

In recent years, artificial intelligence systems that implement human intelligence have been used in various fields. Artificial intelligence (AI) system is a system that the machine learns, judges and becomes smart, unlike the existing rule-based smart system. As the use of artificial intelligence systems improves recognition rate and understanding of user's taste more accurately, existing rule-based smart systems are gradually being replaced by deep learning-based artificial intelligence systems.

AI technology is composed of machine learning (e.g., deep learning) and elementary technologies which utilizes machine learning.

Machine learning is an algorithm technology that classifies and/or learns the characteristics of input data by itself. Element technology is a technology that simulates functions such as recognition and judgment of human brain using machine learning algorithms such as deep learning. Machine learning is composed of technical fields such as linguistic understanding, visual understanding, reasoning and/or prediction, knowledge representation, motion control, and the like.

Various fields in which AI technology is applied are as follows. Linguistic understanding is a technology for recognizing, applying and/or processing human language and/or characters and includes natural language processing, machine translation, dialogue system, question and answer, speech recognition and/or synthesis, and the like. Visual understanding is a technique for recognizing and processing objects as human vision, including object recognition, object tracking, image search, human recognition, scene understanding, spatial understanding, image enhancement, and the like. Inference prediction is a technique for judging and logically inferring and predicting information, including knowledge and/or probability based inference, optimization prediction, preference-based planning, and recommendation. Knowledge representation is a technology for automating human experience information into knowledge data, including knowledge building (data generation and/or classification) and knowledge management (data utilization). The motion control is a technique for controlling the autonomous running of a vehicle and a motion of a robot, including motion control (navigation, collision, driving), operation control (behavior control), and the like.

In recent years, due to the development of artificial intelligence, a chat can be performed with a chatbot (i.e., a chatting robot) provided by an external server. The chatbot has been developed for a specific purpose and can provide a chat service only for the developed purpose (e.g., shopping, customer consultation, reservation, and the like).

If there is a need to perform chatting for a different purpose during a chat with these chatbots, one needs to stop chatting with the chatbot currently performing the conversation and start chatting with the chatbot with other purposes. In this case, there is a drawback that a user has to decide the chatbot that he or she intends to perform conversation, and that a new chat should be performed regardless of the existing chat history.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to an electronic device which determines a chatbot based on the acquired text information and chat history information and is capable of performing chatting without interruption of conversation flow by chatting text information and chat history information to the determined chatbot, and a controlling method thereof.

Another aspect of the disclosure is to provide a controlling method of an electronic device for determining a chatbot using an artificial intelligence learning model includes receiving a voice uttered by a user, processing the voice and acquiring text information corresponding to the voice, and displaying the text information on a chat screen, determining a chatbot for providing a response message regarding the voice by inputting the acquired text information and chat history information regarding the chat screen to a model which is trained to determine the chatbot by inputting text information and chat history information, transmitting the acquired text information and the chat history information regarding the chat screen to a server for providing the determined chatbot, and receiving a response message from the server and displaying the response message on the chat screen.

Additional aspects will be set forth in part in the description which follows and, in part, will be apparent from the description, or may be learned by practice of the presented embodiments.

In accordance with an aspect of the disclosure, an electronic device is provided. The electronic device includes a display, a user inputter, a communicator, a processor electrically connected to the display, the user inputter, and the communicator, and a memory electrically connected to the processor, wherein the processor is configured to: control the display to display a chat screen, when voice uttered by a user is input through the user inputter, acquire text information corresponding to the voice by processing the voice, control the display to display the text information on the chat screen, determine a chatbot for providing a response message regarding the voice by inputting the acquired text information and chat history information regarding the chat screen to a model which is trained to determine the chatbot by inputting text information and chat history information, control the communicator to transmit the acquired text information and the chat history information regarding the chat screen to a server for providing the determined chatbot, and control the display to receive a response message from the server and display the response message on the chat screen.

As described above, a user may reduce troublesome efforts to designate a chatbot one by one, and even if a chatbot is changed, a user may perform conversation with a changed chatbot without the flow of a conversation being interrupted.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1A:
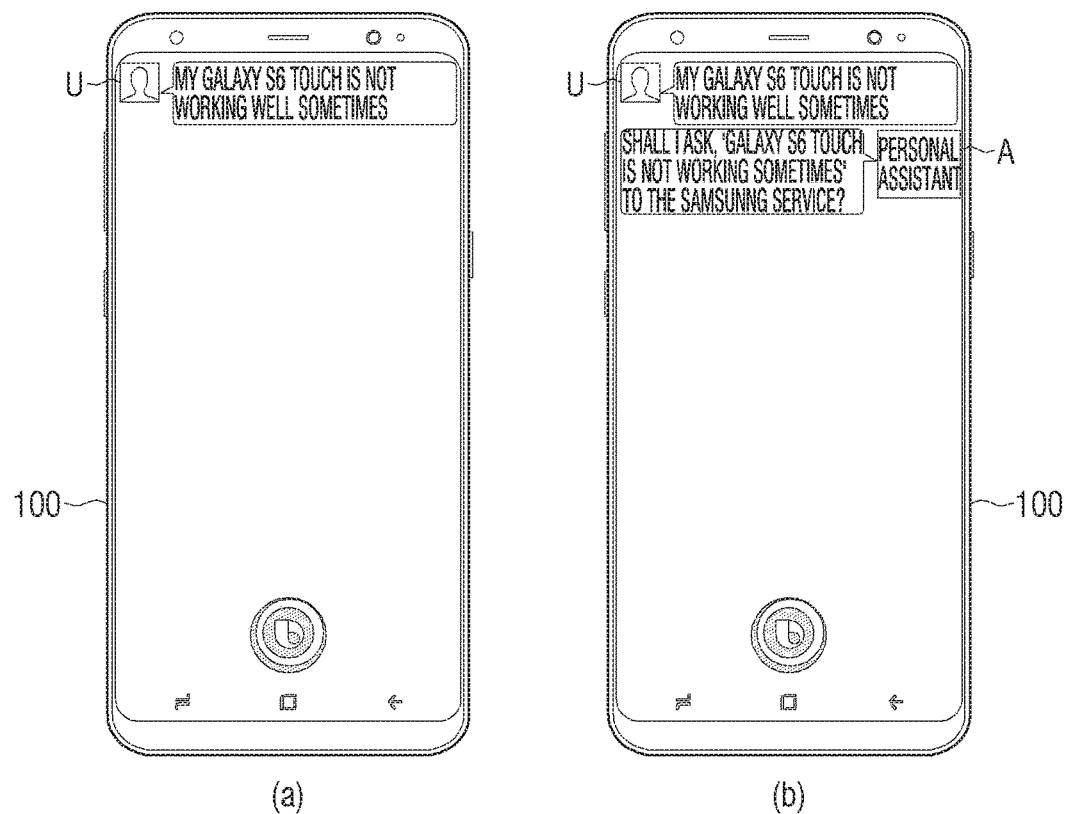
FIGS. 1A and 1B are views to describe an embodiment of chatting with a chatbot by determining the chatbot based on text information and chat history information according to an embodiment of the disclosure.
Figure 1A:
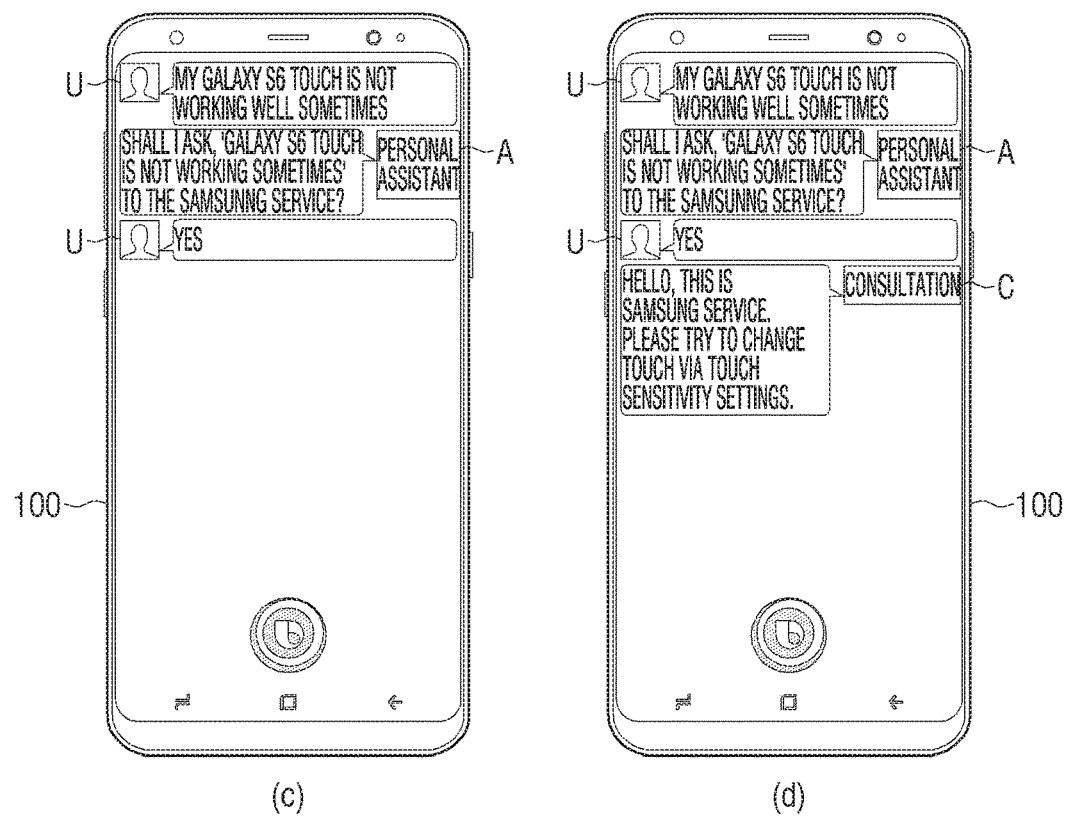

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In this document, the expressions "have," "may have," "including," or "may include" may be used to denote the presence of a feature (e.g., a numerical value, a function, an operation), and does not exclude the presence of additional features.

In this document, the expressions "A or B," "at least one of A and/or B," or "one or more of A and/or B," and the like include all possible combinations of the listed items. For example, "A or B," "at least one of A and B," or "at least one of A or B" includes (1) at least one A, (2) at least one B, (3) at least one A and at least one B all together.

The terms such as "first," "second," and so on may be used to describe a variety of elements, but the elements should not be limited by these terms. The terms are used only for the purpose of distinguishing one element from another.

It is to be understood that a component (e.g., a first component) is "operatively or communicatively coupled with/to" another component (e.g., a second component) is that any such element may be directly connected to the other element or may be connected via another element (e.g., a third element). On the other hand, when it is mentioned that an element (e.g., a first element) is "directly connected" or "directly accessed" to another element (e.g., a second element), it can be understood that there is no other component (e.g. a third component) between the other components.

The expression "configured to" can be used interchangeably with, for example, "suitable for", "having the capacity to", "designed to", "adapted to", "made to", or "capable of". The expression "configured to" does not necessarily mean "specifically designed to" in a hardware sense. Instead, under some circumstances, "a device configured to" may indicate that such a device can perform an operation along with another device or part. For example, the expression "a processor configured to perform A, B, and C" may indicate an exclusive processor (e.g., an embedded processor) to perform the corresponding operation, or a generic-purpose processor (e.g., a central processor (CPU) or application processor (AP)) that can perform the corresponding operations by executing one or more software programs stored in the memory device.

An electronic apparatus and an external device in accordance with various embodiments of the disclosure may include at least one of, for example, smartphones, tablet PCs, mobile phones, video telephones, electronic book readers, desktop PCs, laptop PCs, netbook computers, workstations, servers, a personal digital assistant (PDA), a portable multimedia player (PMP), an moving picture experts group phase 1 or phase 2 (MPEG-1 or MPEG-2) audio layer 3 (MP3) player, a medical device, a camera, or a wearable device. A wearable device may include at least one of the accessory type (e.g.: as a watch, a ring, a bracelet, a bracelet, a necklace, a pair of glasses, a contact lens or a head-mounted-device (HMD)); a fabric or a garment-embedded type (e.g.: a skin pad or a tattoo); or a bio-implantable circuit. In some embodiments, the electronic apparatus may be, for example, a television, a digital versatile disc (DVD) player, audio, refrigerator, cleaner, ovens, microwaves, washing machines, air purifiers, set top boxes, home automation control panels, security control panels, media box (e.g.: Samsung HomeSync™, Apple TV™, or Google TV™), game consoles (e.g.: Xbox™ PlayStation™), electronic dictionary, electronic key, camcorder, or electronic frame.

In other embodiments, the electronic apparatus and the external device may include at least one of a variety of medical devices (e.g.: various portable medical measurement devices such as a blood glucose meter, a heart rate meter, a blood pressure meter, or a temperature measuring device), magnetic resonance angiography (MRA), magnetic resonance imaging (MRI), computed tomography (CT), or ultrasonic wave device, and the like), navigation system, global navigation satellite system (GNSS), event data recorder (EDR), flight data recorder (FDR), automotive infotainment devices, marine electronic equipment (e.g.: marine navigation devices, gyro compasses, and the like), avionics, security devices, car head units, industrial or domestic robots, drone, ATMs, points of sale (POS) of stores, or IoT devices (e.g.: light bulbs, sensors, sprinkler devices, fire alarms, thermostats, street lights, toasters, exercise equipment, hot water tanks, heater, boiler, and the like).

In this disclosure, the term user may refer to a person who uses an electronic apparatus or an apparatus (e.g.: artificial intelligence electronic apparatus) which uses an electronic apparatus.

Hereafter, the disclosure will be further described with reference to attached drawings.

Figure 1B:
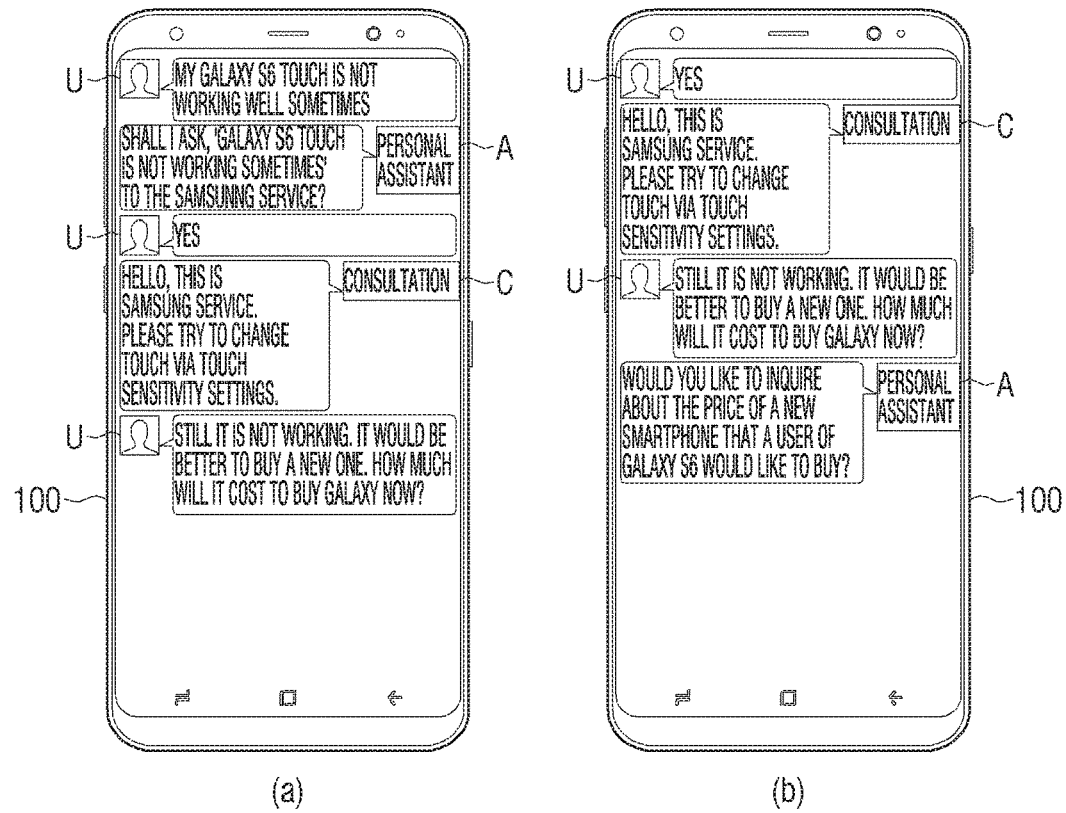
Figure 1B:
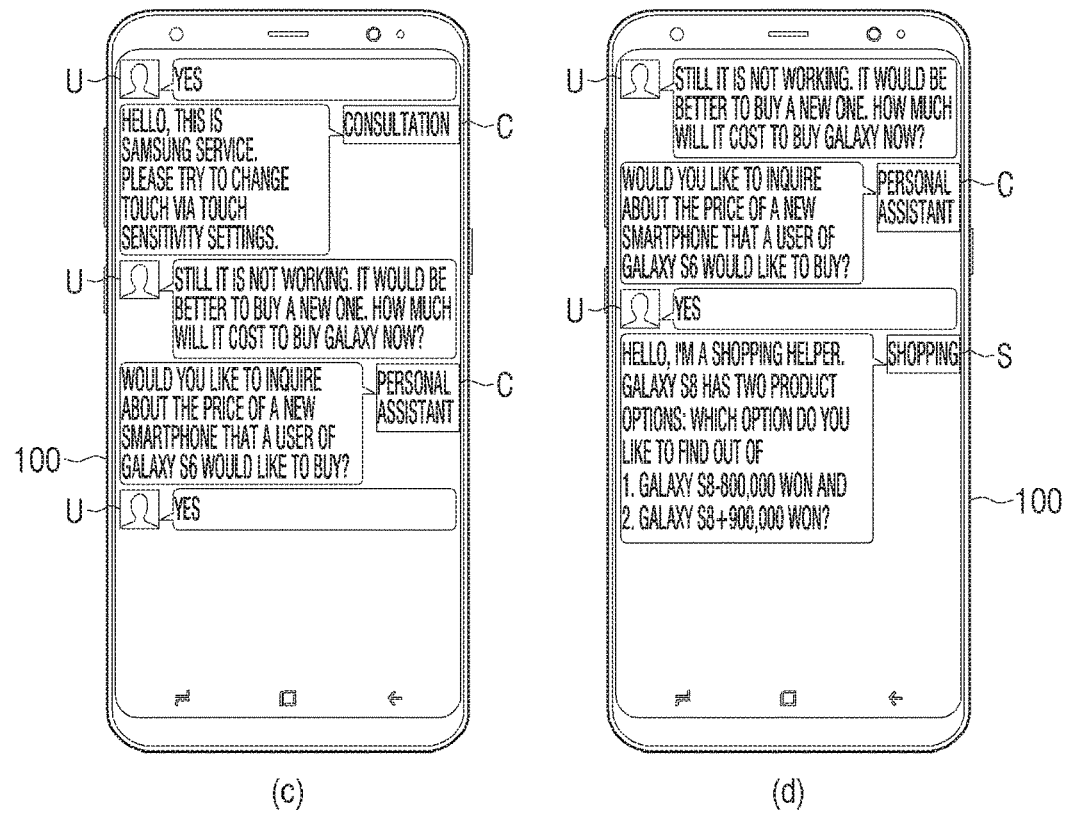

FIGS. 1A and 1B are views to describe an embodiment of chatting with a chatting robot (hereinafter "chatbot") by determining the chatbot based on text information and chat history information according to an embodiment of the disclosure.

Referring to FIGS. 1A and 1B, an electronic device 100 can execute the personal assistant program according to a predetermined user input. The preset user input may be a user input for selecting an icon corresponding to a personal assistant program displayed on the display screen, but this is only an embodiment, and can be implemented as a user's voice including a preset word (e.g., Bixby), and a user input for selecting a button provided in a predetermined area of the electronic device 100, and the like. The personal assistant program is a program for executing a personal assistant chatbot to provide a personal assistant service to a user using the electronic device 100 and may be stored in the electronic device 100, but this is merely exemplary and can be stored in a separate personal assistant chatbot server.

When the personal assistant program is executed, the electronic device 100 can display a chat screen capable of chatting with the personal assistant chatbot. The chat screen may be a dedicated chat screen for chatting with a personal assistant chatbot or a chatbot provided by an external server, but this is merely an example, and can be a chat screen provided by a general chatting program for chatting with another user.

While the chat screen is being displayed, the electronic device 100 can receive the user's voice uttered by the user through a microphone. The electronic device 100 can acquire text information corresponding to the user's voice acquired through the microphone. Specifically, the electronic device 100 can transmit the user's voice acquired through the microphone to an external server (e.g., a Speech to text (STT) server) and acquire text information corresponding to the user's voice. Alternatively, the electronic device 100 may acquire text information corresponding to a user's voice using the STT program stored therein. In the above-described embodiment, it is described that text information is acquired through the user's voice uttered by the user. However, this is merely exemplary, and text information can be acquired through a keypad displayed on the display, and text information can be acquired through an external input device (e.g., a keyboard).

The electronic device 100 may display the acquired text information on the chat screen. For example, if the text information corresponding to the user's voice is "Galaxy S6 touch is not working well sometimes", the electronic device 100 may display on the chat screen "My Galaxy S6 touch is not working well sometimes." The electronic device 100 can display an icon (U) indicating that the user has uttered "My Galaxy S6 touch is not working well sometimes" around the text as illustrated panel (a) of FIG. 1A.

The electronic device 100 may determine whether the acquired text information is text information that the personal assistant chatbot can respond to. The electronic device 100 may determine whether the acquired text information is text information for performing a function within the electronic device 100 or text information for searching information stored in the electronic device 100 and determine whether the acquired text information is text information that the personal assistant chatbot can respond to.

If the text information is that the personal assistant chatbot can respond to, the electronic device 100 may provide a response message to the text information via the personal assistant chatbot. If the text information is that the personal assistant chatbot cannot respond to, the electronic device 100 may determine a chatbot capable of providing a response message to the text information. The electronic device 100 can determine the chatbot that can provide a response message to the text information by inputting the text information into a learned model to determine the chatbot based on the text information and the chat history information. For example, the electronic device 100 may determine a "customer consultation chatbot" as a chatbot that can provide a response message to the user's voice via the learned model. The chatbot is a chatbot having a chat domain corresponding to the user text information, and can be provided by an external server.

When a chatbot capable of providing a response message to the text is determined through the learned model, the electronic device 100 may display an inquiry message for determining whether to request a response message to the user through the personal assistant chatbot. For example, as shown in panel (b) of FIG. 1A, the electronic device 100 may display an inquiry message such as "Shall I ask, 'Galaxy S6 touch is not working sometimes' to the Samsung Service?" Around the inquiry message, an icon (A) indicating that the message is uttered by the personal assistant chatbot can be displayed.

When a user's voice for a response to the inquiry message is input, the electronic device 100 can acquire text information on the user's voice and display the obtained text information. For example, as shown in panel (c) of FIG. 1A, the electronic device 100 may display text information "Yes."

When the request response to the inquiry message is input, the electronic device 100 may transmit the previously acquired text information to the server providing the determined chatbot. For example, the electronic device 100 may transmit text information such as "Galaxy S6 touch is not working sometimes" to a customer consultation chatbot server that provides a customer consultation chatbot.

The customer consultation chatbot server can generate a response message for the received text information using the customer consultation chatbot and transmit the generated response message to the electronic device 100. The electronic device 100 may display the received response message. For example, the electronic device 100 may display a response message "Hello, this is a Samsung service, please try to change touch via touch sensitivity settings" as shown in panel (d) of FIG. 1A. Around the response message, an icon (C) indicating that the customer information chatbot uttered can be displayed.

As described above, the electronic device 100 may determine a chatbot capable of providing a response message for a user's voice through the personal assistant chatbot, and receive a response message from the determined chatbot.

The electronic device 100 may receive a user's voice which is newly uttered by a user through a microphone. The electronic device 100 may acquire text information which corresponds to a user's voice newly acquired through the microphone.

The electronic device 100 may display the acquired text information on the chat screen. For example, if the text information corresponding to the user's voice is "Still it is not working. It would be better to buy a new one. How much will it cost to buy Galaxy now", the electronic device 100, as illustrated in panel (a) of FIG. 1B, may display "Still it is not working. It would be better to buy a new one. How much will it cost to buy Galaxy now" on the chat screen.

The electronic device 100 may determine whether the obtained text information is text information that the personal assistant chatbot can respond to. If the information is that the personal assistant chatbot cannot respond to, the electronic device 100 may determine a chatbot capable of providing a response message regarding the text information. The electronic device 100 can determine a chatbot that can input text information and chat history information into the learned model to provide a response message regarding the text information. The chat history information may be information on a conversation history between the user and the chatbot in the current or previous chat screen. For example, the electronic device 100 may determine a "shopping chatbot" as a chatbot that can provide a response message to the user's voice through the learned model. That is, the electronic device 100 can determine a chatbot that can provide a response message to a user's voice by using not only text information corresponding to a simple user's voice but also chat history information.

When the chatbot that can provide a response message regarding a text through the learned model is determined, the electronic device 100 may display an inquiry message to determine whether to ask a response message to the chatbot through the personal assistant chatbot.

When user's voice for responding to the inquiry message is input, the electronic device 100 may acquire text information regarding the user's voice and display the acquired text information. For example, as illustrated in panel (c) of FIG. 1B, the electronic device 100 may display text information "Yes."

When the request response to the inquiry message is input, the electronic device 100 can transmit the previously obtained text information to the determined chatbot. For example, the electronic device 100 may transmit the text information "Would you like to inquire about the price of a new smartphone that a user of Galaxy S6 would like to buy" in panel (b) of FIG. 1B and chat history information "Galaxy S6 touch is not working" together to a shopping chatbot server providing the shopping chatbot.

The shopping chatbot server can generate a response message to the received text information and chat history information by using the customer consultation chatbot. The shopping chatbot can generate a response message using both the text information and the chat history information together. For example, a shopping chatbot can generate a response message by selecting a smartphone that has a good touch among recommended smartphones for a user of Galaxy S6.

The shopping chatbot server can transmit the generated response message to the electronic device 100. The electronic device 100 may display the received response message. For example, the electronic device 100 may, as illustrated in panel (d) of FIG. 1B, display a response message saying "Hi, I'm a shopping helper. Galaxy S8 has two product options: which option do you like to find out of 1. Galaxy S8–800,000 Won and 2. Galaxy S8+900,000 Won?" An icon (S) indicating that the message is uttered by the shopping chatbot can be displayed around the response message.

As described above, the electronic device 100 may determine a chatbot capable of providing a response message by taking into consideration of not only the user's voice but also the chat history information through the personal assistant chatbot, and receive a response message from the determined chatbot.

In the above-described embodiment, the electronic device 100 determines that the chatbot by inputting the text information and the chat history information into the learned model. However, this is merely exemplary, and a chatbot which can input not only text information but also various context information to the learned model to provide a response message can be determined. The context information may include user profile information, user search information, user preference information, and the like. The user profile information may be user information stored by the user in the electronic device 100 or the personal assistant program, and may include various user information such as user's gender, user's age, user's body information, user's origin information, and the like. The user search information may include information that the user has searched before executing the personal assistant chatbot, and the user preference information may include information on the user's preferred content and a category.

Also, the electronic device 100 can transmit various context information as well as text information and chat history information to a chatbot server that provides chatbots. The chatbot server may generate a response message based on text information and various context information. For example, the shopping chatbot server may provide a response message by selecting a recommended product based on user profile information, user search information, user preference information, and the like, along with text information.

The learned model as described above is a determination model which is learned based on artificial knowledge and may be a model based on neural network. The object determination model can be designed so that human brain structure can be simulated in computer, and may include a plurality of network nodes which simulate neurons of human neural network and have a weight. The plurality of network nodes may form each connection relation so that neurons simulate synaptic activities of neurons that send and receive a signal through synapse. In addition, the object determination model may include, for example, a neural network model or a deep learning model that is developed from the neural network model. In the deep learning model, the plurality of network nodes are positioned in different depths (or layers) and may transceive data according to a convolution connection relation. An example of an object determination model may include deep neural network (DNN), recurrent neural network (RNN), bidirectional recurrent deep neural network (BRDNN), but it is not limited thereto.

Also, the electronic device 100 can use a personal assistant program, which is an artificial intelligence agent, to determine a chatbot to provide a response message as described above and to provide a response message. The personal assistant program is a dedicated program for providing an AI-based service and is executed by a general-purpose processor (e.g., a CPU) or a separate AI-specific processor (e.g., a GPU). In particular, an artificial intelligence agent can control various modules to be described later.

Specifically, a predetermined user input (e.g., an icon touch corresponding to a personal assistant chatbot, a user's voice including a predetermined word, or the like) is input or a button (e.g., a button for executing an artificial intelligence agent) is pressed, the artificial intelligence agent can operate. The artificial intelligent agent determines a chatbot capable of responding to the user's voice based on the text information and the chat history information corresponding to the input user's voice, and transmits the text information and chat history information to the chatbot server providing the determined chatbot. Then, the artificial intelligence agent can display the response message received from the chatbot server.

Of course, if the predetermined user input is detected on the screen or a button (e.g., a button for executing the AI agent) of the electronic device 100 is pressed, the AI agent may operate. Alternatively, the artificial intelligence agent may be in a previously executed state in which a predetermined user input is sensed or a button provided in the electronic device 100 is selected. In this case, after predetermined user input is detected or a button provided on the electronic device 100 is selected, the artificial intelligent agent of the electronic device 100 can determine a chatbot that can respond to the user's voice. In addition, the artificial intelligence agent may be in a standby state previously selected when a preset user input is sensed or a button provided in the electronic device 100 is selected. The standby state is a state in which a predefined user input is received to control the start of operation of the AI agent. If a predefined user input is sensed while the artificial intelligence agent is in the standby state, or a button provided on the electronic device 100 is selected, the electronic device 100 may activate the artificial intelligence agent and decide a chatbot capable of responding to a user's voice.

The artificial agent may control various modules to be described later. This will be described in a greater detail.

Figure 2:
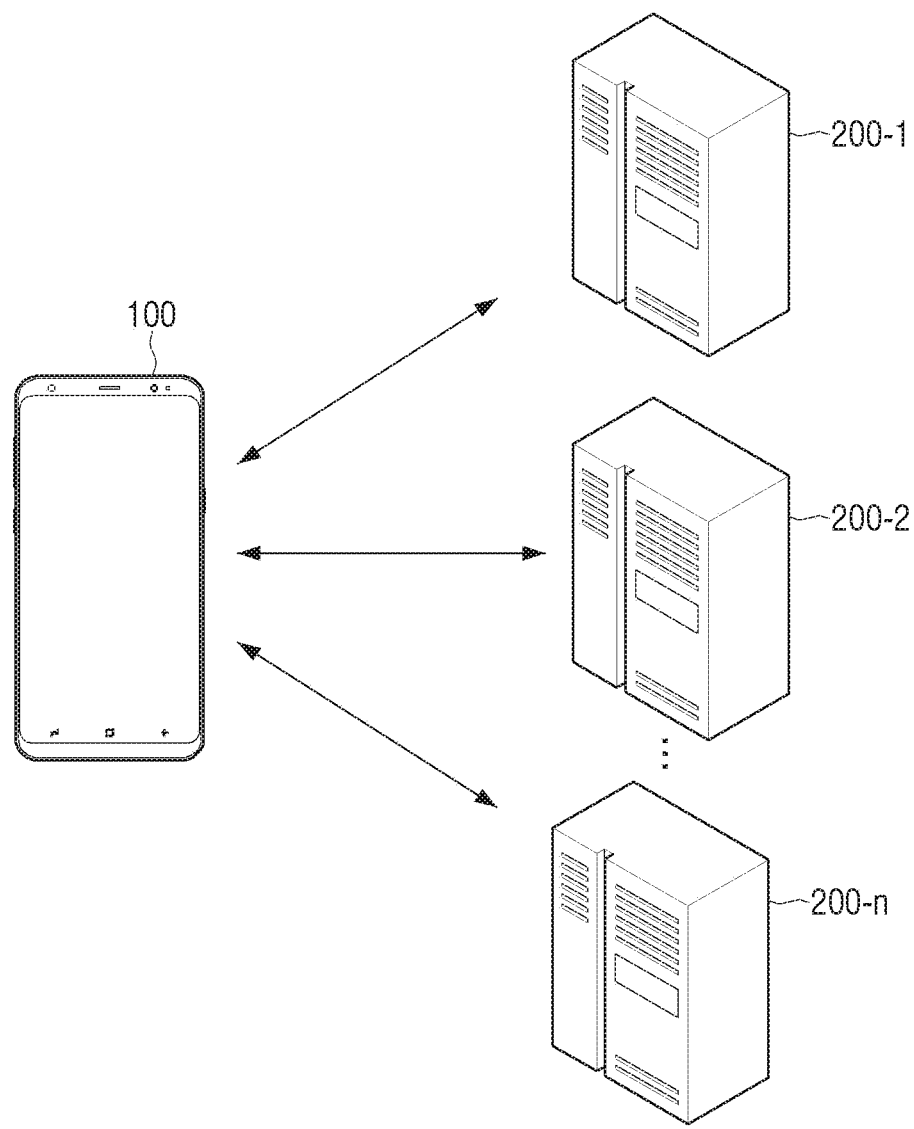
FIG. 2 is a view briefly illustrating system including an electronic device and a chatbot server providing a chatbot according to an embodiment of the disclosure.

FIG. 2 is a view briefly illustrating system including an electronic device and a chatbot server providing a chatbot according to an embodiment of the disclosure.

Referring to FIG. 2, the system may include the electronic device 100 and a plurality of chatbot servers 200-1, 200-2, . . . , 200-*n*.

The electronic device 100 may store a personal assistant program. A user may perform chatting with a personal assistant chatbot through a personal assistant program or a chatbot provided by an external chatbot server. When a predetermined user command is input, the electronic device 100 may execute or activate a personal assistant program.

Also, when an event for registering a new chatbot (e.g., an event for receiving information about a new chatbot from the outside, an event for inputting a user command for adding a new chatbot, and the like) is generated, the electronic device 100 can register a new chatbot. The electronic device 100 can acquire the structure information of the new chatbot. For example, the electronic device 100 can acquire the structure information of the new chatbot using the metadata of the new chatbot, and can acquire the structure information of the new chatbot through the conversation with the new chatbot. This will be described later in detail.

After the personal assistant program is executed, when the user's voice is input, the electronic device 100 may input the text information and the chat history corresponding to the user's voice to the learned model and determine a chatbot for providing a response message regarding the user's voice from among a plurality of chatbot servers 200-1, 200-2, . . . , 200-*n*. In addition, the electronic device 100 may provide a response message regarding the user's voice through the personal assistant program. In particular, while the electronic device 100 performs chatting with a first chatbot, when a chatbot for providing a response message regarding the current user's voice is determined as a second chatbot, the electronic device 100 may provide the text information and chat history information corresponding to the user's voice to the second chatbot server providing the second chatbot.

Also, the electronic device 100 may transmit text information and chat history information about the user's voice to the chatbot server, and may receive and provide a response message to the text information and chat history information from the chatbot server. The electronic device 100 may generate the inquiry message including the text information and the chat history information by using the structure information of the chatbot. Also, the chatbot server 200 can transmit a response message regarding the inquiry message using the structure information.

The plurality of chatbot servers 200-1, 200-2, . . . , 200-*n* can provide chatbots having corresponding chat domains.

For example, a first chatbot server 200-1 may provide a chatbot having a shopping domain, a second chatbot server 200-2 may provide a chatbot having an IoT device control domain, and a third chatbot server 200-3 may provide a chatbot having a customer consultation domain, but is not limited thereto.

The plurality of chatbot servers 200-1, 200-2, ..., 200-n may generate a response message based on the text information and chat history information received by the personal assistant program of the electronic device 100. Each of the plurality of chatbot servers 200-1, 200-2, ..., 200-n may perform natural language processing on the received text information, and generate a response message based on the text information and the chat history information processed as the natural language.

The plurality of chatbot servers 200-1, 200-2, ..., 200-n can generate a response message based on the structure information of the chatbot. That is, the plurality of chatbot servers 200-1, 200-2, ..., 200-n can generate a response message based on functions, sub-functions, attributes, and the like that the chatbot can provide.

Further, between the personal assistant program of the electronic device 100 and the plurality of chatbot servers 200-1, 200-2, ..., 200-n, there may be information transfer specification for transmitting text information and chat history information (or context information). The information transfer specification is specification for transmitting information between the personal assistant program and the chatbot server 200-n, and may provide an inquiry message and a response message using structure information of a chatbot.

Therefore, the personal assistant program of the electronic device 100 may transmit text information and chat history information based on information transfer specification.

Figure 3A:
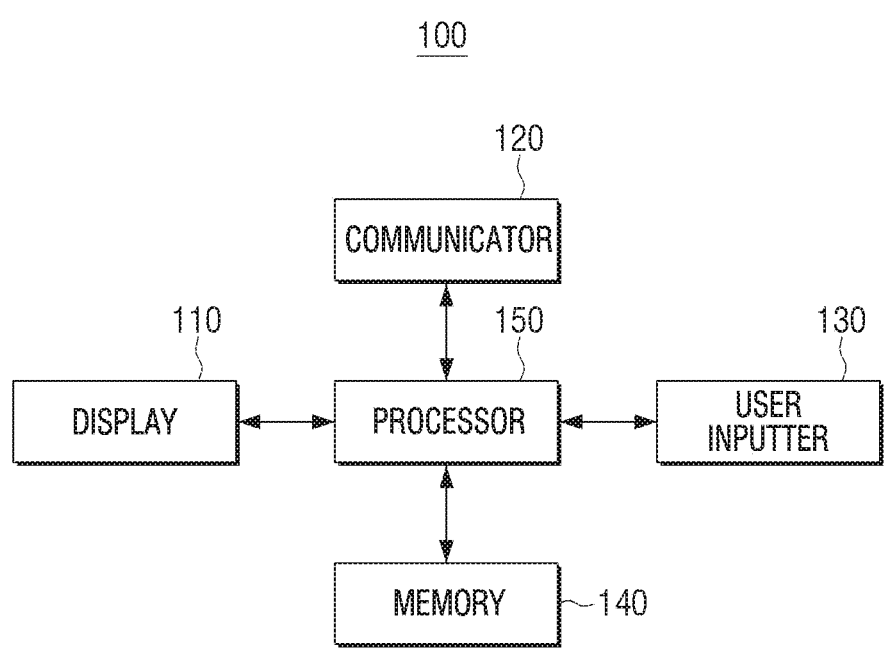
FIGS. 3A and 3B are block diagrams illustrating a configuration of an electronic device according to various embodiments of the disclosure.
Figure 3B:
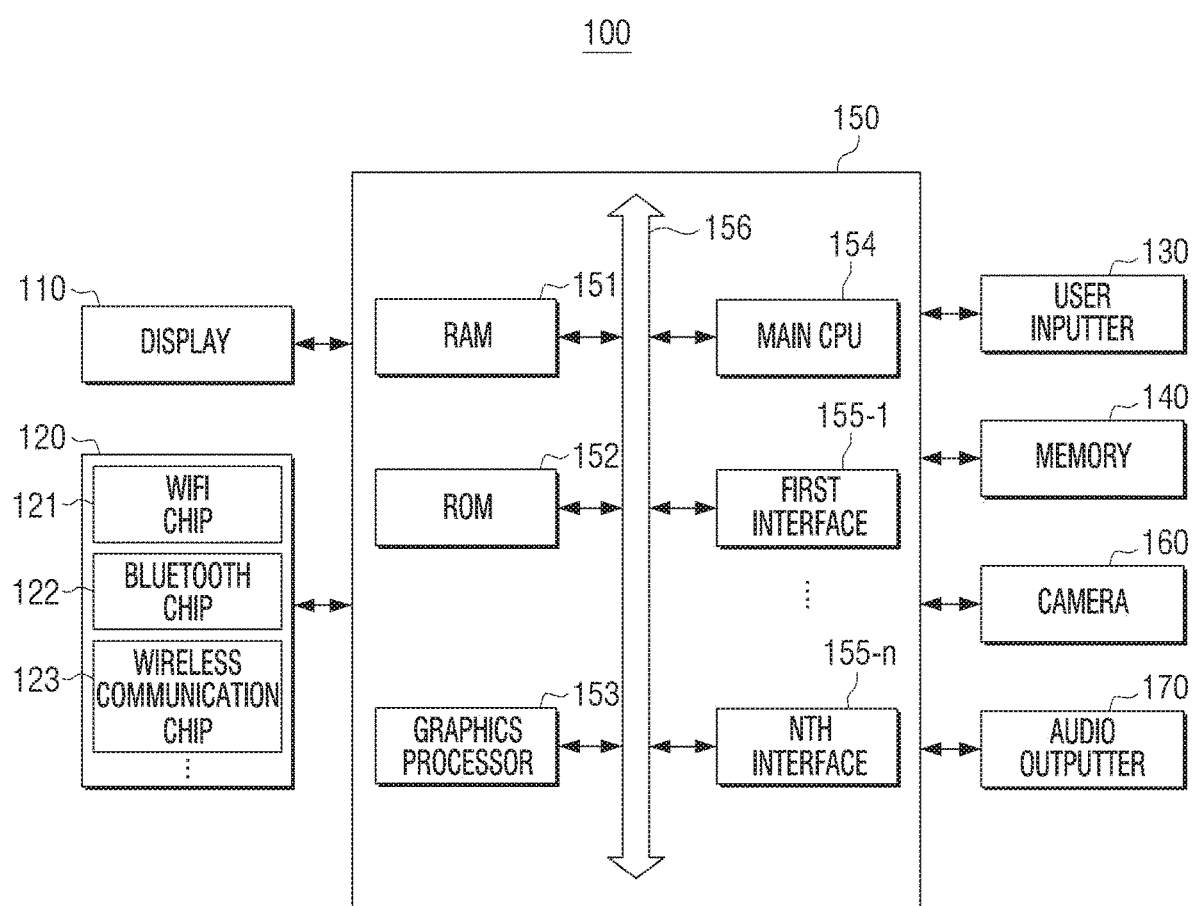

FIGS. 3A and 3B are block diagrams showing the configuration of an electronic device according to an embodiment of the disclosure.

Referring to FIG. 3A, the electronic device 100 may include a display 110, a communicator 120, a user inputter 30, a memory 140, and a processor 150. The configurations shown in FIG. 3A are diagrams for implementing embodiments of the disclosure, and appropriate hardware and/or software configurations of a level obvious to those skilled in the art may be further included in the electronic device 100.

The display 110 may provide various screens. In particular, the display 110 may display a chat screen for chatting with a personal assistant chatbot or an external chatbot. The chat screen may include an icon, text, or the like for indicating a user, a personal assistant chatbot, or an external chatbot.

The communicator 120 can perform communication with an external device through various communication methods. In particular, the communicator 120 can communicate with an external chat server and receive a response message. Also, if there is a personal assistant chatbot server, the communicator 120 can communicate with the personal assistant chatbot server.

The user inputter 130 may receive various user inputs and transmit the various user inputs to the processor 150. In particular, the user inputter 130 may include a touch sensor, a (digital) pen sensor, a pressure sensor, a key, or a microphone. The touch sensor can use, for example, at least one of an electrostatic type, a pressure sensitive type, an infrared type, and an ultrasonic type. The (digital) pen sensor may be, for example, a part of a touch panel or may include a separate recognition sheet. The key may include, for example, a physical button, an optical key, or a keypad. The microphone may be provided inside the electronic device 100 for receiving the user's voice but may be provided outside the electronic device 100 to be electrically connected to the electronic device 100.

In particular, the user inputter 130 may acquire an input signal according to a user input for selecting a predetermined user touch for selecting an icon corresponding to the personal assistant program or a button provided outside the electronic device 100. The user inputter 130 may then send an input signal to the processor 150.

The memory 140 may store instructions or data related to at least one other component of the electronic device 100. In particular, the memory 140 may be implemented as a non-transitory memory, a transitory memory, a flash memory, a hard disk drive (HDD), or a solid state drive (SSD). The memory 140 is accessed by the processor 150 and read/write/modify/delete/update of data by the processor 150 can be performed. The term memory in the disclosure includes the memory 140, ROM (not shown), RAM (not shown) in the processor 150, or a memory card (not shown) (e.g., a micro SD card and a memory stick) mounted in the electronic device 100. In addition, the memory 140 may store a program and data for configuring various screens to be displayed in the display area of the display 110.

Figure 4:
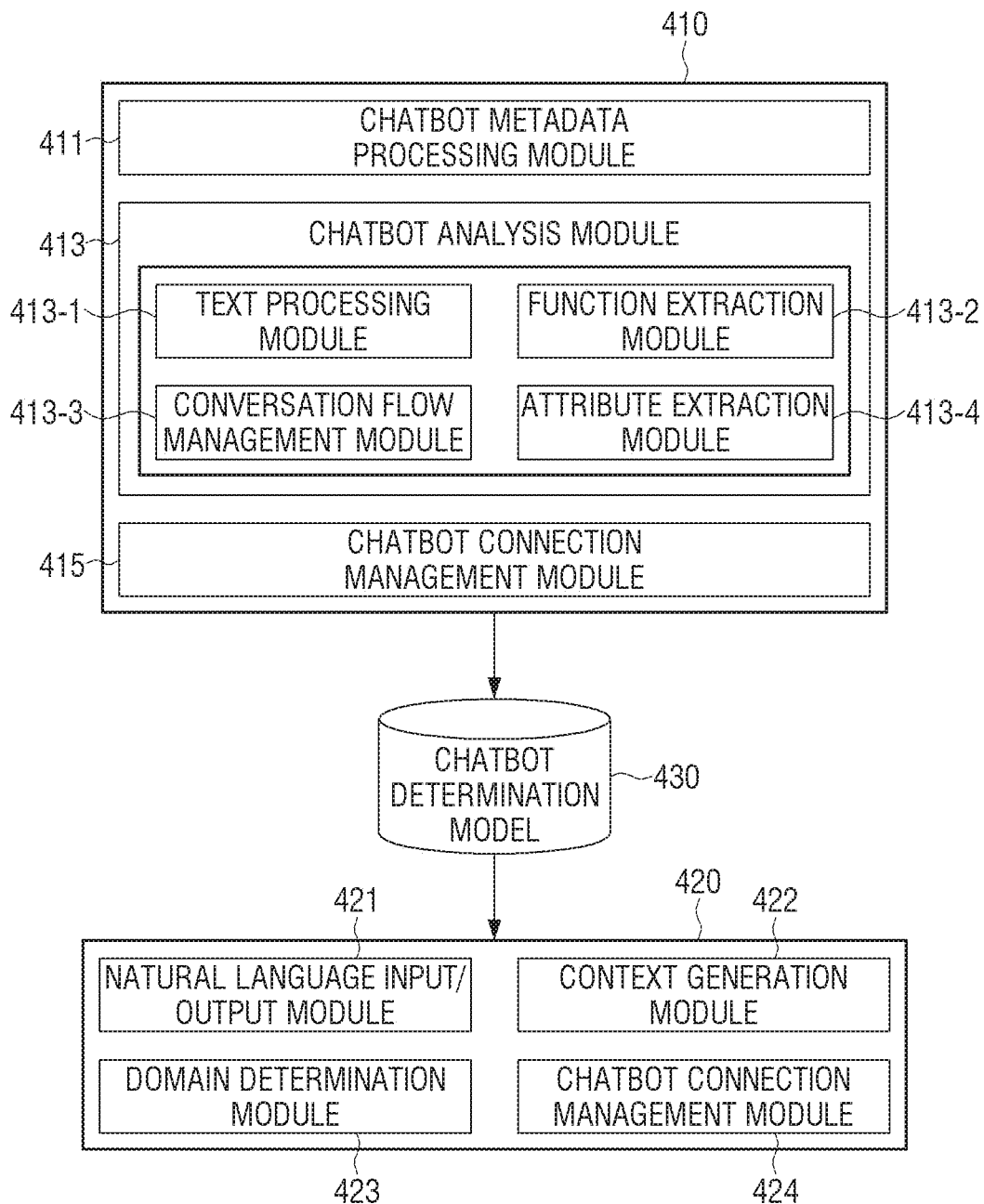
FIG. 4 is a block diagram illustrating a plurality of modules included in an electronic device according to an embodiment of the disclosure.

In particular, the memory 140 may store a personal assistant program. The personal assistant program is a personalized program for providing various services for the electronic device 100. In particular, the personal assistant program may include a chatbot registration module 410 and a chatbot determination module 420, as shown in FIG. 4. This will be described later in detail with reference to FIG. 4

The memory 140 may store the chatbot determination model 430 which is learned to determine a chatbot for providing a response message by using the text information and chat history information (or context information).

The processor 150 may be electrically connected to the display 110, the communicator 120, the user inputter 130, and the memory 140 to control the overall operation and functions of the electronic device 100. In particular, the processor 150 may provide a chat service with the chatbot using various modules stored in the memory 140. In particular, the processor 150 may control the display 110 to display a chat screen for chatting with the chatbot. When a voice uttered by the user is input through the user inputter 130 while the chat screen is displayed, the electronic device 100 processes the user's voice to acquire text information corresponding to the voice, and control the display 110 to display text information on the chat screen. The processor 150 may determine a chatbot for inputting text information and chat history information regarding a chat screen to the model learned to determine a chatbot by inputting text information and history information, and control the communicator 120 to transmit the obtained text information to the chatbot server providing the determined chatbot and chat history information regarding the chat screen. The processor 150 may control the display 110 to receive a response message from the chatbot server determined through the communicator 120 and display a response message on a chat screen. A method of providing a response message of a chatbot by the processor 150 will be described later.

Referring to FIG. 3B, the electronic device 100 may include the display 110, the communicator 120, the user inputter 130, the memory 140, the processor 150, the camera 160, and an audio outputter 170. Since the display 110, the memory 140, and the user inputter 130 have been described with reference to FIG. 3A, redundant descriptions will be omitted.

The communicator 120 can perform communication with various types of external devices according to various types of communication methods. The communicator 120 may include at least one of a Wi-Fi chip 121, a Bluetooth chip 122, and a wireless communication chip 123. The processor 150 can communicate with an external chat server or various external devices using the communicator 120. In addition, the communicator 120 can perform communication with an external device through various communication chips such as an NFC chip.

The camera 160 can take an image including an external object. The camera 160 may be provided on at least one of the front and rear of the electronic device 100. The camera 160 may be provided inside the electronic device 100, but it is merely exemplary, and the camera exists outside the electronic device 100, and may be wired or wirelessly connected to the electronic device 100.

The audio outputter 170 is configured to output various kinds of audio data as well as various kinds of notification sounds and voice messages in which various processing operations such as decoding, amplification, and noise filtering are performed by an audio processor (not shown). In particular, the audio outputter 170 may be implemented as a speaker, but this is merely exemplary and it may be implemented as an output terminal capable of outputting audio data.

In particular, the audio outputter 170 may provide a user with information regarding a search result to a user in an audio format.

The processor 150 (or controller) may control overall operations of the electronic device 100 using various programs stored in the memory 140.

The processor 150 may be composed of a RAM 151, a ROM 152, a graphics processer 153, a main CPU 154, first to $n^{th}$ interfaces 155-1 to 155-n, and a bus 156. The RAM 151, the ROM 152, the graphics processor 153, the main CPU 154, the first to $n^{th}$ interfaces 155-1 to 155-n and the like can be connected to each other via the bus 156.

FIG. 4 is a block diagram illustrating a plurality of modules included in an electronic device according to an embodiment of the disclosure.

Referring to FIG. 4, the electronic device 100 may include a chatbot registration module 410 and a chatbot determination module 420.

The chatbot registration module 410 is a module to register a chatbot to a personal assistant program, and may include a chatbot metadata processing module 411, a chatbot analysis module 413, and a chatbot connection management module 415.

The chatbot metadata processing module 411 can acquire and register the structure information of the chatbot based on the metadata of the chatbot when the chatbot exists. Specifically, the chatbot metadata processing module 411 analyzes the metadata of the chatbot and obtains and stores the structure information on the attributes for performing the functions and functions provided by the chatbot.

If the metadata of the chatbot does not exist, the chatbot analysis module 413 can analyze and register the structure information of the chatbot through a chat with the chatbot. Specifically, the chatbot analysis module 413 can transmit an inquiry message for inquiring the structure information of the functions provided by the chatbot to the chatbot server that provides the chatbot, receive the response message to the inquiry message, and generate the structure information of the functions provided by the chatbot. This will be described later in detail with reference to FIG. 6B.

Particularly the chatbot analysis module 413 may include a text processing module 413-1, a function extraction module 413-2, a conversation flow management module 413-3, and an attribute extraction module 413-4. The text processing module 413-1 can perform text processing of the response message received from the chatbot. The function extracting module 413-2 and the attribute extracting module 413-4 can extract the functions and attributes of the chatbot based on the text information text-processed from the response message. The conversation flow management module 413-3 can provide the inquiry message necessary for conversation flow to extract the functions and attributes of the chatbot.

The chatbot connection management module 415 can manage various information for connection with the chatbot server. For example, the chatbot connection management module 415 may store information on a chatbot provided by the chatbot server, address information of the chatbot server, identification information, domain information, and the like.

The information of the chatbot and structure information regarding the chatbot registered through the chatbot registration module 410 may be provided to the chatbot determination model 430.

The chatbot determination module 420 can determine a chatbot according to a user's voice. Particularly, the chatbot determination module 420 can determine the chatbot that provides the response message to the user voice by inputting the text information corresponding to the user voice and the context information (including the chat history information) to the chatbot determination model 430.

In particular, the chatbot determination module 420 may include a natural language input/output module 421, a context generation module 422, a domain determination module 423, and a chatbot connection management module 424. The natural language input/output module 421 can display natural language processing on the text information of the inputted user voice on the chat screen. The context generation module 422 may generate the context information necessary to determine the chatbot providing the response message. The context information may include user profile information, user search information, user preference information, and the like, as well as chat history information on the chat screen. The domain determination module 423 can determine the domain of the user voice input using the chatbot determination model 430. That is, the domain determination module 423 can determine a chatbot that can provide a response message to the user's voice. The chatbot connection management module 124 can manage various information that can be connected to the chatbot server.

The chatbot determination model 430 may be a model that is learned to determine a chatbot for providing a response message based on context information including text information and chat history information corresponding to a user's voice. The chatbot determination model 430 can be learned based on the functions included in the structure information of the chatbot.

Through the chatbot registration module 410 and the chatbot determination module 420 as described above, a user can receive various services while maintaining the context by only talking with the chatbot without any additional input.

Figure 5:
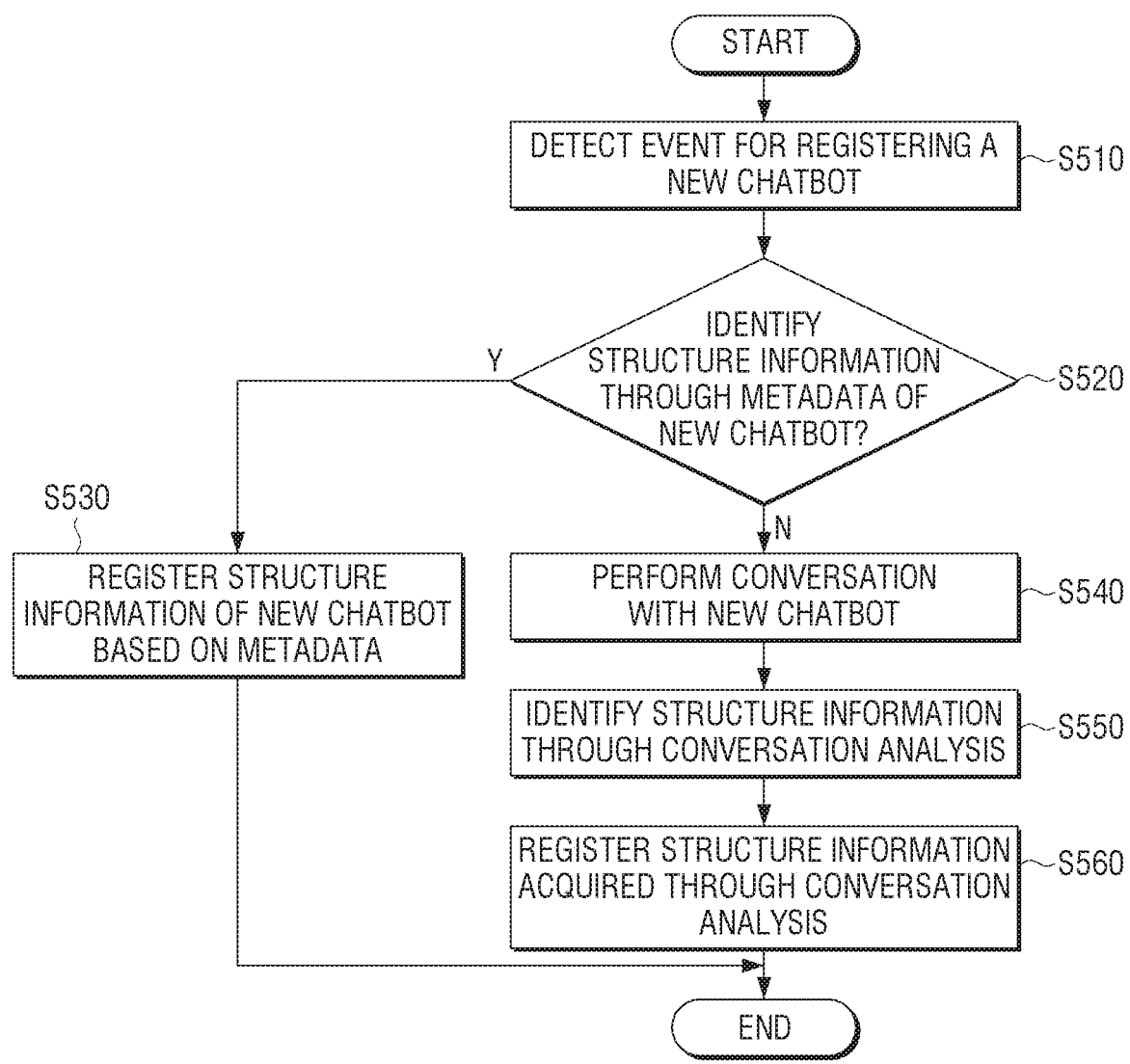
FIG. 5 is a flowchart describing a method for registering a chatbot according to an embodiment of the disclosure.

FIG. 5 is a flowchart describing a method for registering a chatbot according to an embodiment of the disclosure.

First, the electronic device 100 can detect an event for registering a new chatbot in operation S510. An event for registering a new chatbot may include an event in which registration request information is received from a new chatbot, an event in which a user receives a user input for registering a new chatbot, and the like, but the disclosure is not limited thereto.

The electronic device 100 may determine whether the new chatbot structure information can be grasped through the metadata of the new chatbot to be registered in operation S520. That is, the electronic device 100 can determine whether or not it is possible to grasp information on attributes required for performing the functions and functions provided by the new chatbot through the metadata. The structure information of the new chatbot may be information that hierarchically stores information on the new chatbot, a function that the new chatbot can provide, and information on an attribute required to perform the function. In addition, although the metadata of the new chatbot may be a known format such as JSON, XML, etc., it may be a unique format for representing the metadata of the new chatbot.

Figure 6A:
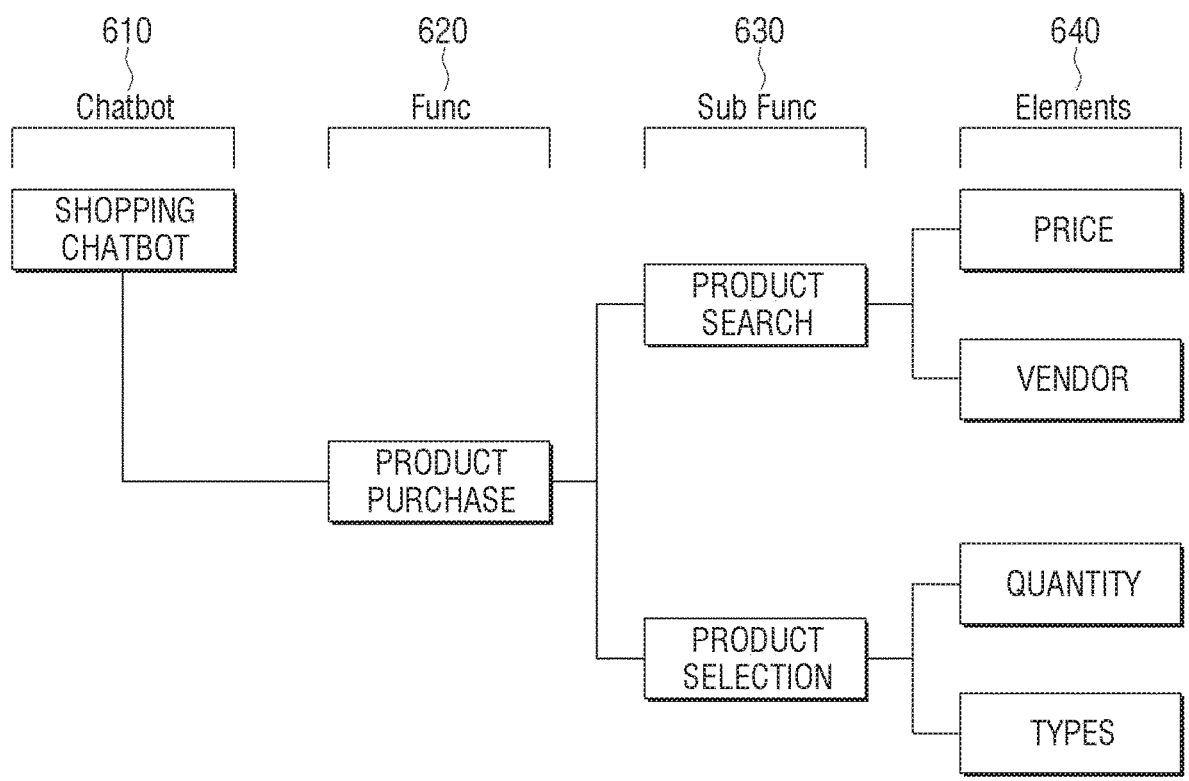
FIG. 6A is a view to describe structure information of a function which a chatbot provides according to an embodiment of the disclosure.
Figure 6B:
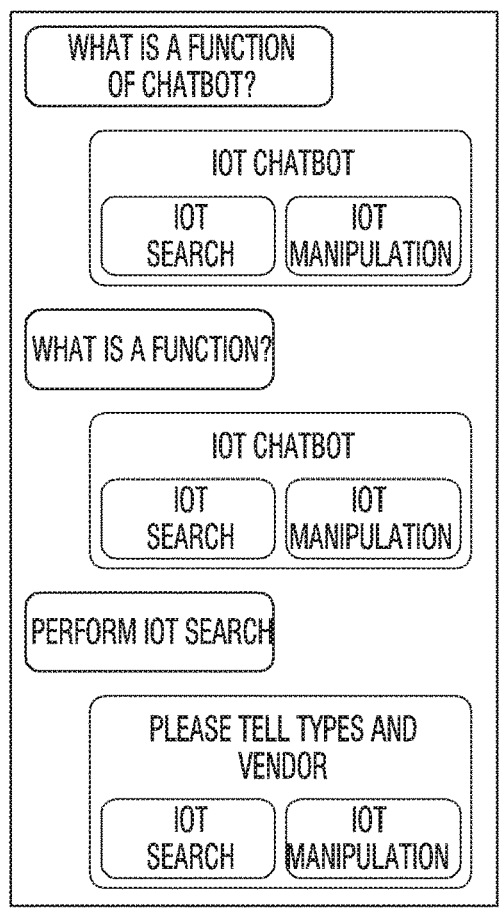
FIG. 6B is a view to describe a method for identifying structure information of a chatbot according to an embodiment of the disclosure.
Figure 6B:
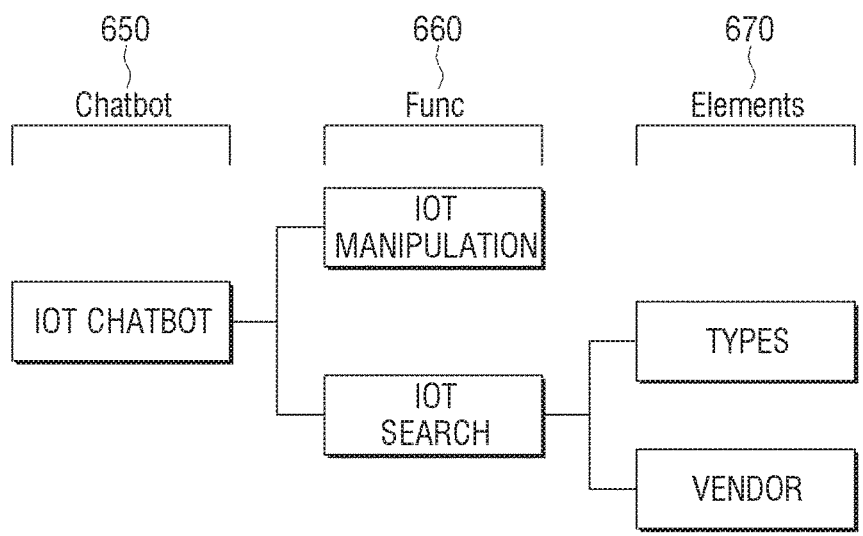

For example, referring to FIG. 6A, when the new chatbot is a shopping chatbot, the structure information of the shopping chatbot may be information that hierarchically stores information 610 about the shopping chatbot, a function 620 provided by the shopping chatbot, and the sub-function 630 that can be provided by the shopping chatbot, and an attribute 640 necessary for performing the function or the sub-function.

If the structure information can be grasped through the metadata of the new chatbot in operation S520 Y, the electronic device 100 can register the structure information of the new chatbot based on the metadata in operation S530. As an example, the electronic device 100 may register the structure information of the new chatbot as shown in FIG. 6A in the personal assistant program.

If the structure information cannot be grasped through the metadata of the new chatbot in operation S520 N, the electronic device 100 can perform a dialogue with the new chatbot in operation S540. Specifically, the electronic device 100 may transmit an inquiry message inquiring about the attributes required to perform functions and functions provided by the new chatbot to the chatbot server that provides the new chatbot. For example, as shown in panel (a) of FIG. 6B, the electronic device 100 can transmit an inquiry message "What is a function of the chatbot?" To the IoT chatbot server to inquire about the function of the new chatbot, and can receive a response message including information on a chatbot provided by the IoT chatbot server and information on a function that the chatbot can provide. In order to check again the sub-functions provided by the IoT chatbot, the electronic device 100 may transmit a message inquiring "What is a function of the chatbot?" to the IoT chatbot server, and receive from the IoT chatbot server a response message including information on the chatbot provided by the IoT chatbot server and functions that the chatbot can provide. Also, the electronic device 100 can transmit an inquiry message "Perform IoT search" in order to inquire information about attributes necessary for performing a function, and receive a response message "please tell types and vendors" including information on attributes necessary for IoT search from the IoT chatbot server. In the meantime, the electronic device 100 may not display a dialogue as shown in panel (a) of FIG. 6B, but this is merely exemplary, and a dialogue as in panel (a) of FIG. 6B for registering structure information according to user setting can be displayed on a screen.

The electronic device 100 can grasp the structure information of the new chatbot through the dialog analysis in operation S550. Specifically, the electronic device 100 can grasp the functions provided by the chatbot through the response message to the inquiry message inquiring about the functions provided by the new chatbot. In addition, the electronic device 100 can acquire information on attributes necessary for performing a function through a response message to an inquiry message inquiring about attributes necessary for performing a function. For example, the electronic device 100 can register the structure information of the IoT chatbot as shown in panel (b) of FIG. 6B through a dialogue as shown in panel (a) of FIG. 6B. That is, the information about the IoT chatbot 650, the function 660 provided by the IoT chatbot, and the attributes 670 necessary for performing the function can be grasped as the structure information of the IoT chatbot.

The electronic device 100 may register the structure information obtained through the dialogue analysis in operation S560. For example, the structure information of the chatbot as illustrated in panel (b) of FIG. 6B can be registered to the personal assistant program.

In the aforementioned embodiment, it has been described that the electronic device 100 registers the new chatbot and the structure information of the new chatbot, but this is merely exemplary, and the electronic device 100 may update the structure information provided by the existing chatbot by the aforementioned method.

Figure 7:
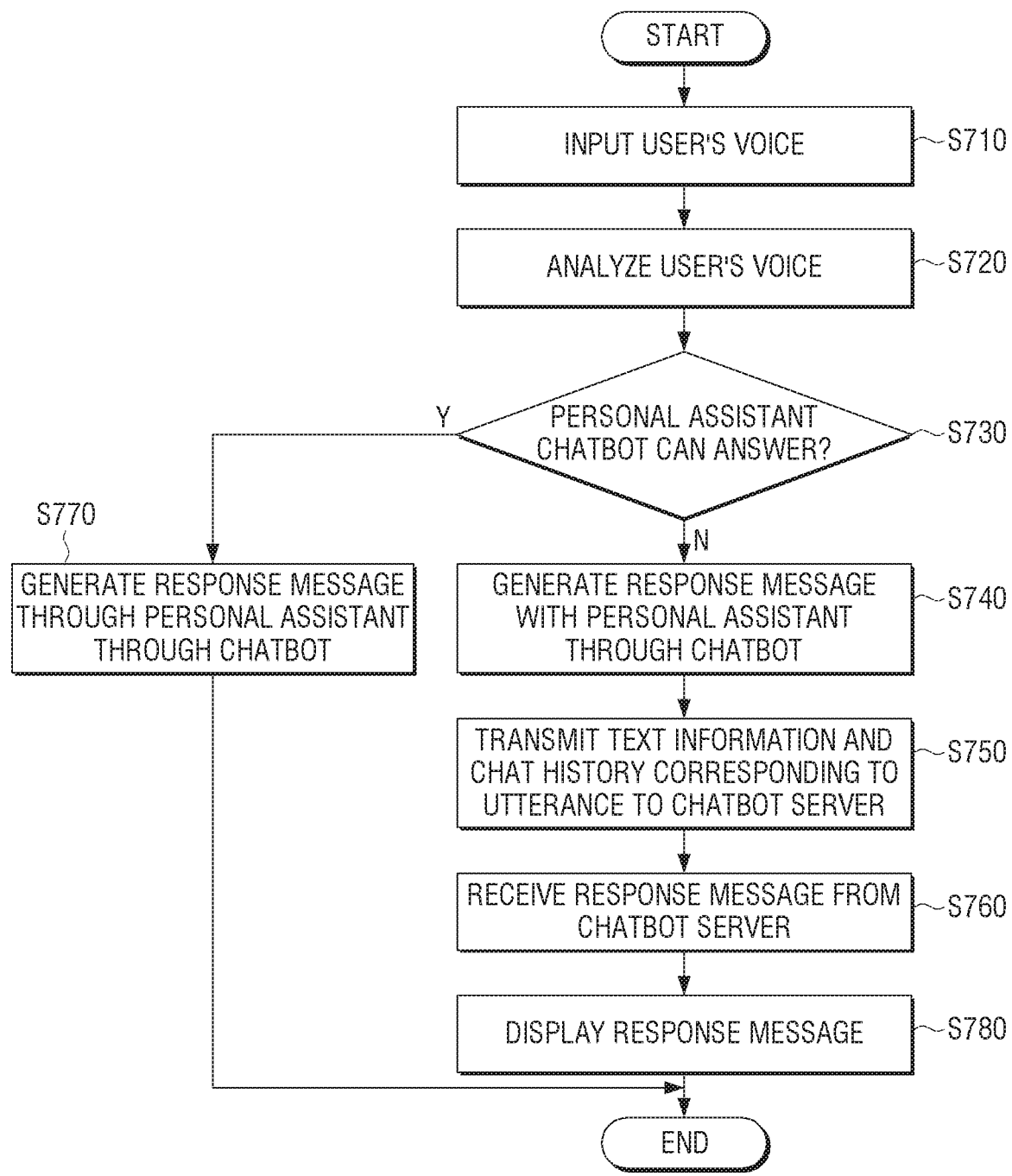
FIG. 7 is a flowchart to describe an embodiment of performing chatting by changing a chatbot according to an embodiment of the disclosure.

FIG. 7 is a flowchart to describe an embodiment of performing chatting by changing a chatbot according to an embodiment of the disclosure.

First, the electronic device 100 receives a user voice uttered by the user in operation S710. Specifically, the electronic device 100 may receive a user's voice through a microphone included in the user inputter 130. The personal assistant program is executed in the electronic device 100, and a chat screen for chatting with the personal assistant chatbot can be displayed.

The electronic device 100 may analyze the user's voice in operation S720. Specifically, the electronic device 100 can acquire text information corresponding to the user's voice through natural language processing on the user's voice. The electronic device 100 can acquire all the text information corresponding to the user's voice, but it is only an embodiment and can extract the core text among the text information corresponding to the user's voice.

The electronic device 100 may determine whether the personal assistant chatbot is answerable based on the obtained text information in operation S730. The electronic device 100 may determine whether the obtained text information is text information to perform a function of the electronic device 100 or to search for information stored in the electronic device 100 and determine whether the obtained text information is the information that the personal assistant chatbot can answer.

If the personal assistant chatbot is available in operation S730 Y, the electronic device 100 may generate a response message via the personal assistant chatbot in operation S770. For example, when the text information corresponding to the user's voice is text information for inquiring the schedule stored in the electronic device 100 or for changing the setting of the electronic device 100, the electronic device 100 may generate a response message regarding the text information through the personal assistant chatbot.

If the personal assistant chatbot is unavailable in operation S730 N, the electronic device 100 may determine a chatbot to provide a response message using the learned module in operation S740. The learned module may be a chatbot determination module that is learned to determine a chatbot for providing a response message using text information and chat history information as input data.

Also, the electronic device 100 can determine one of the functions corresponding to the chatbots determined based on the structure information. That is, the electronic device 100 may use the structure information of the chatbot stored in the personal assistant program to determine the function of the chatbot that the user desires to inquire, and may generate an inquiry message corresponding to the determined function. Specifically, the electronic device 100 may load structure information of the determined chatbot, processes the text information corresponding to the user's voice in a form that the chatbot can process based on the structural information, and process the context information including the chat history information to the chatbot in a processable form to generate an inquiry message. For example, if what the user wishes to inquire about is an article purchasing function of the chatbot, the electronic device 100 may generate an inquiry message so as to correspond to the article purchasing function based on the structure information of the shopping chatbot.

The electronic device 100 may transmit the text information and the chat history information corresponding to the utterance to the chat server provided with the determined chat bots in operation S750. At this time, the electronic device 100 may transmit not only chat history information but also context information such as user profile information, user search information, and user preference information. An information transmission standard for transmitting text information and chat history information may exist between the personal assistant program and the chatbot stored in the electronic device 100, and the electronic device 100 may transmit an inquiry to the electronic device 100 using the information transmission standard.

The electronic device 100 may receive a response message from the chatbot server in operation S760. The chatbot server may transmit a response message using an inquiry message corresponding to a function determined ahead.

The electronic device 100 may display a response message which is generated through the personal assistant chatbot or received from the chatbot server in operation S780.

Figure 8:
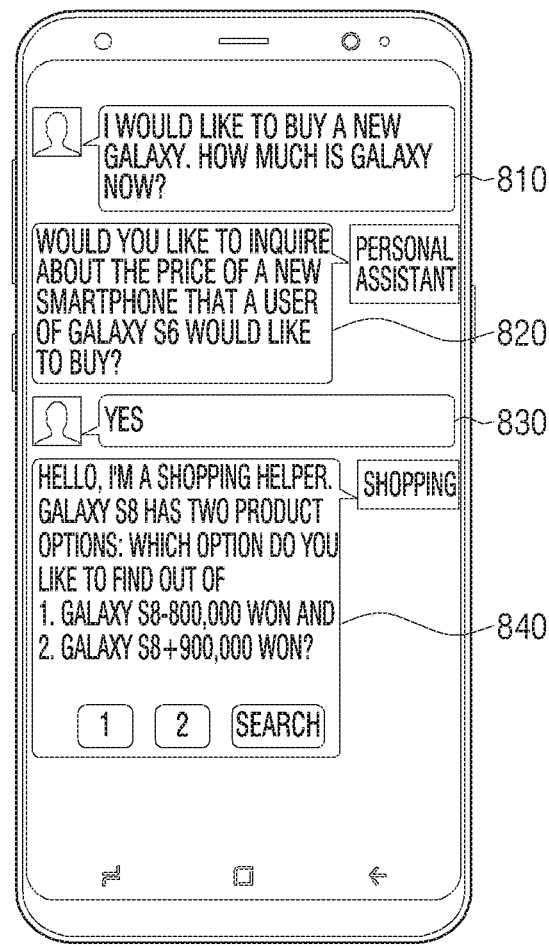
FIGS. 8, 9A, and 9B are views to describe embodiments of transmitting an inquiry message and receiving a response message with a chatbot server according to various embodiments of the disclosure.
Figure 9A:
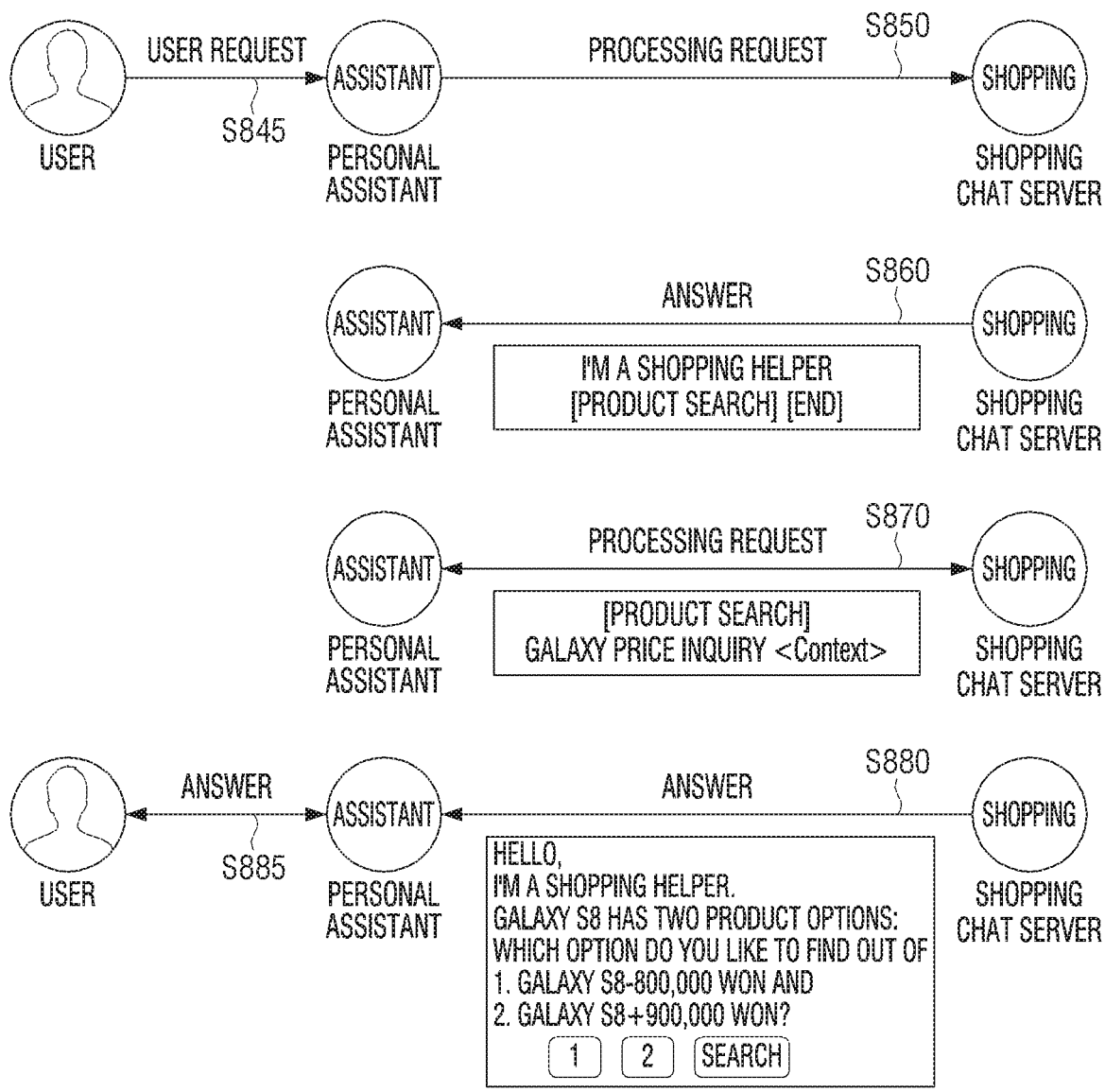
Figure 9B:
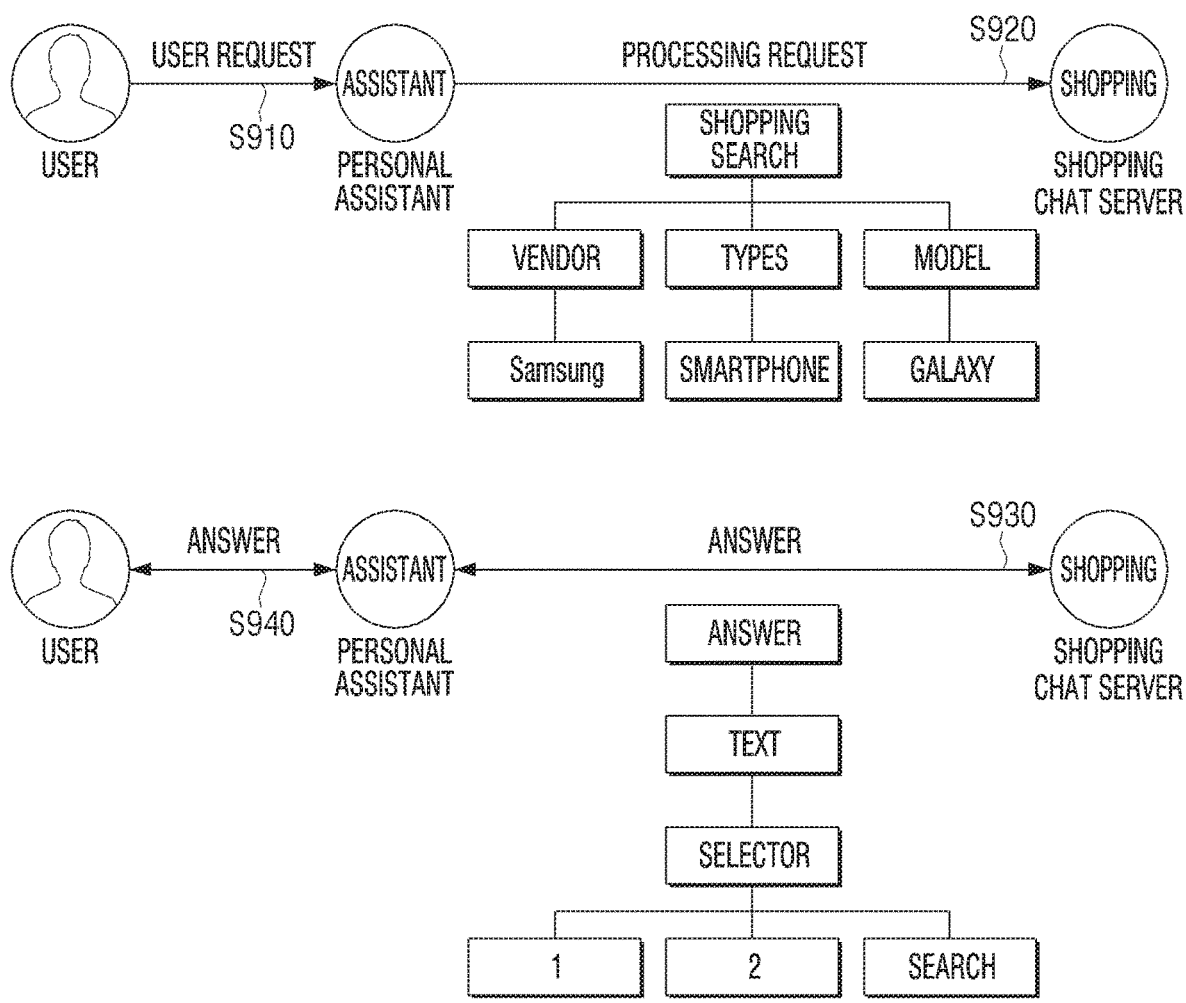

FIGS. 8, 9A, and 9B are views to describe embodiments of transmitting an inquiry message and receiving a response message with a chatbot server according to an embodiment of the disclosure.

Referring to FIG. 8, a user can chat with a personal assistant chatbot and a shopping chatbot. That is, when the user inputs a user voice for shopping, the electronic device 100 may receive an inquiry message 810 for shopping, and the electronic device 100 may send an inquiry message 820 to a user through the personal assistant chatbot, and may receive the request message 830 again from the user. The electronic device 100 may transmit the inquiry message 810 to the shopping chatbot server determined in response to the request message 830 received from the user and receive the response message 840 from the shopping chatbot server.

In particular, the electronic device 100 and the shopping chatbot server may go through the process as described in FIG. 9A and transceive the inquiry message 810 and the response message 840.

FIG. 9A is a diagram to describe an embodiment to generate an inquiry message through natural language processing and receive a response message.

Referring to FIG. 9A, when a user request including a response message is received in operation S845, the personal assistant program of the electronic device 100 may perform processing request to the shopping chatbot in operation S850.

The shopping chatbot server may transmit a reply to a personal assistant program in response to a request for processing in operation S860. The reply may include information on the shopping chatbot provided by the shopping chatbot server and information on a function provided by the shopping chatbot.

The personal assistant program of the electronic device 100 may transmit a processing request in operation S870 including "Galaxy price inquiry and context information" for searching a product to the shopping chatbot server based on the received reply.

The shopping chatbot server may send a reply including the response message 840 to the electronic device 100 in response to the processing request in operation S880, and the personal assistant program may send the received reply to the user as shown in FIG. 8 in operation S885.

FIG. 9B is a view for describing an embodiment of generating and transmitting an inquiry message and receiving a response message using the structure information and the information transmission standard.

Referring to FIG. 9B, the structure information of the shopping chatbot is registered in the personal assistant program of the electronic device 100, and the information transmission standard according to the structure information may exist between the personal assistant program of the electronic device 100 and the shopping chatbot.

To be specific, the electronic device 100 and the shopping chatbot server may go through the process of FIG. 9B and transceive the inquiry message 810 and the response message 840.

First, when a user request including a response message is received in operation S910, the personal assistant program of the electronic device 100 can perform a processing request to the shopping chatbot in operation S920. The processing request may include an inquiry message generated according to the structure information. That is, the processing request may include the inquiry message that is generated according to a function that can be provided by the shopping chatbot based on the structure information of the shopping chatbot and the attribute to perform the function. The inquiry message may follow the information transmission standard that is determined between the personal assistant program and the shopping chatbot.

The shopping chatbot server may transmit a response, in response to the processing request in operation S930. The shopping chatbot server may also generate a response message according to the method determined by the information transmission standard and transmit the response message to the personal assistant program of the electronic device 100. In particular, the response message generated according to the information transmission standard may have a structure such as a text and a selector as shown in FIG. 9B. The text may include a reply to the user inquiry, and the selector may include an indicator that can be selected to perform the user inquiry.

The personal assistant program may process the received response message to be displayed on a screen and provide the same to a user in operation S940.

As described above, by transmitting an inquiry message and a response message based on the structure information and the information transmission standard, a response message can be received more rapidly and efficiently without an unnecessary process.

Figure 10:
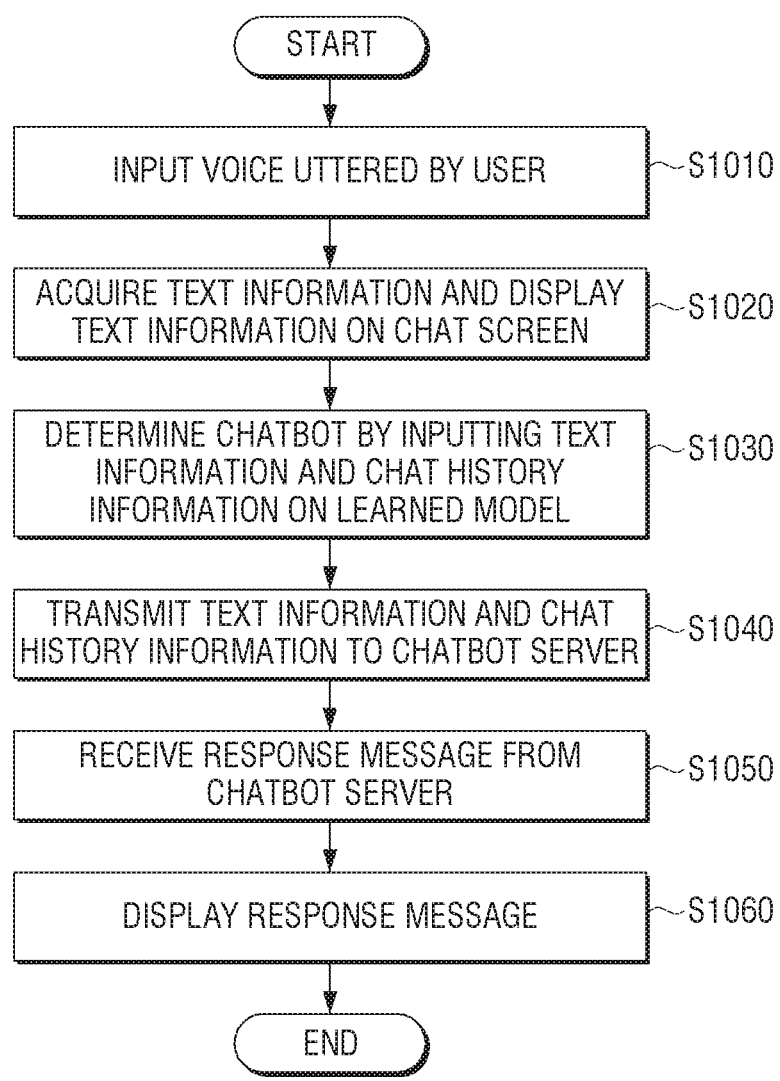
FIG. 10 is a flowchart to describe a controlling method of an electronic device according to an embodiment of the disclosure.

FIG. 10 is a flowchart to describe a controlling method of an electronic device according to an embodiment of the disclosure.

Referring to FIG. 10, the electronic device 100 may receive a user's voice uttered by a user in operation S1010.

The electronic device 100 can acquire text information from the user's voice and display the text information on the chat screen in operation S1020. The electronic device 100 can acquire the text information through the user's voice uttered by the user, but this is merely an example, and the text information can be acquired according to a user input that is input through a keypad displayed on the display and a user input that is input through an external device (e.g., a keyboard).

The electronic device 100 can determine the chatbot by inputting the text information and the chat history information into the learned model in operation S1030. The learned model may be a chatbot determination model that is learned to determine a chatbot that can provide a response message to user voice using text information and chat history information as input data.

The electronic device 100 may transmit the text information and chat history information to the chatbot server providing the determined chatbot in operation S1040. The electronic device 100 may transmit context information such as user profile information, user search information, user preference information, and the like, in addition to the chat history information. In addition, the electronic device 100 may generate an inquiry message including text information and chat history information according to a predetermined information transmission standard with the chat server, and may transmit the inquiry message to the chat server.

The electronic device 100 may receive a response message from the chatbot server in operation S1050. The determined chatbot server can generate a response message to the user voice based on the inquiry message generated by the information transmission standard. The response message generated by the chatbot may also be generated according to the information transmission standard between the electronic device 100 and the chatbot server.

The electronic device 100 may display a response message in operation S1060. To be specific, the electronic device 100 may process the response message received from the chatbot server to be displayable and provide the same to a user.

Figure 11:
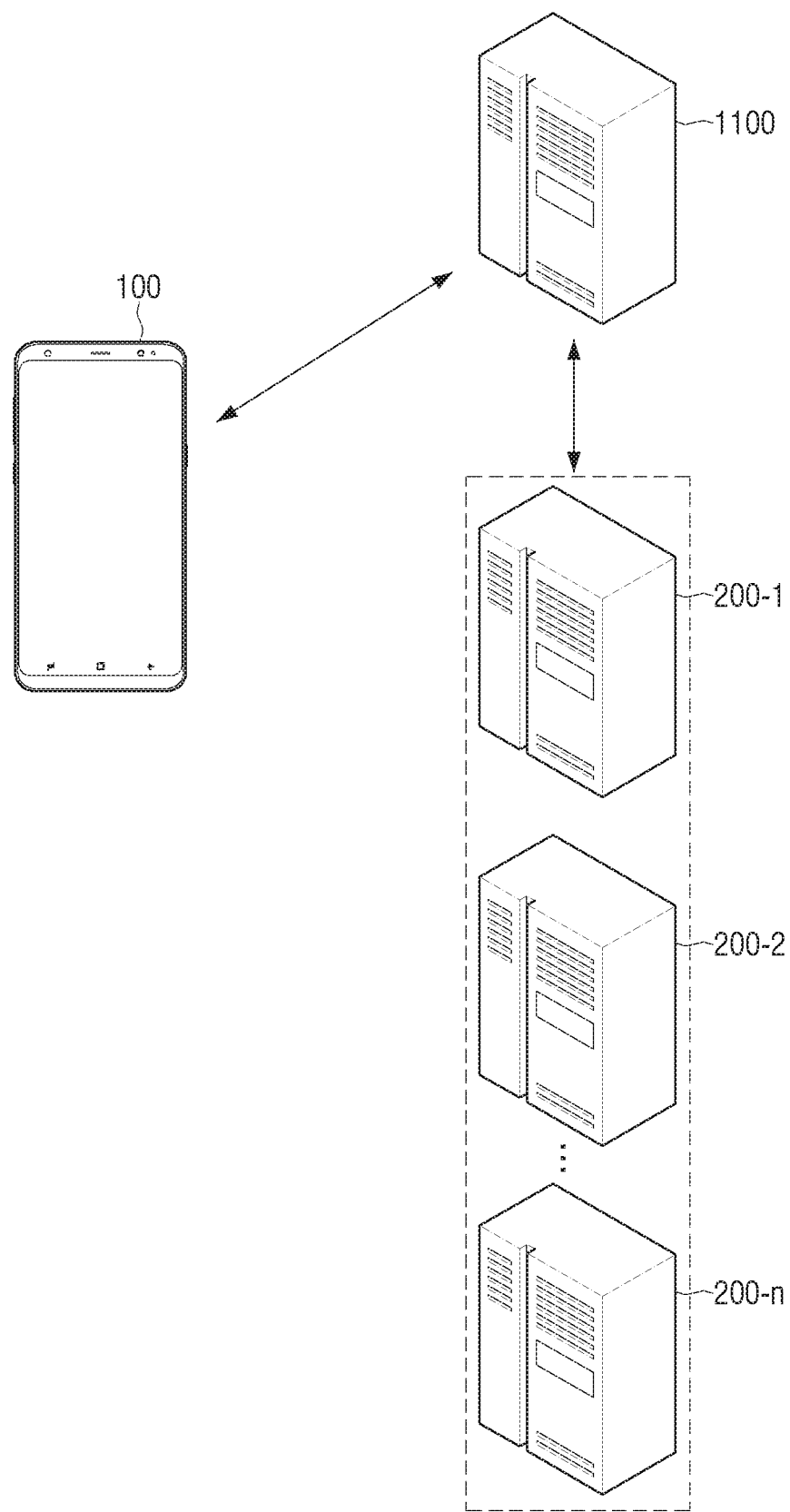
FIG. 11 is a view briefly illustrating a system including an electronic device, a server providing a personal assistant chatbot and an external chatbot server according to another embodiment of the disclosure.

FIG. 11 is a view briefly illustrating a system including an electronic device, a server providing a personal assistant chatbot and an external chatbot server according to another embodiment of the disclosure.

Referring to FIG. 11, the personal assistant program is stored in the electronic device 100. However, the personal assistant program may be stored in a separate personal assistant chatbot server. That is, the electronic device 100 can communicate with the external chatbot server 200-1, 200-2, . . . 200-n using a personal assistant chatbot server 1100.

Specifically, the personal assistant chatbot server 1100 may store a personal assistant program capable of providing an AI service to a user of the electronic device 100. The personal assistant chatbot server 1100 can provide various services (e.g., chat service, search service, reservation service, shopping service, etc.) to the electronic device 100 using the personal assistant program.

The personal assistant chatbot server 1100 may store context information (e.g., user profile information, user search information, user preference information, and the like) for the electronic device 100 and the user of the electronic device 100. In addition, the personal assistant chatbot server 1100 may store chat history information on the chat screen. In addition, the personal assistant chatbot server 1100 may store information on the chatbots provided by the external chatbot server 200 (e.g., the structure information of the chatbot).

A specific method of communicating by the electronic device with the external chatbot server 200 using the personal assistant chatbot server 1100 will be described with reference to FIG. 12.

Figure 12:
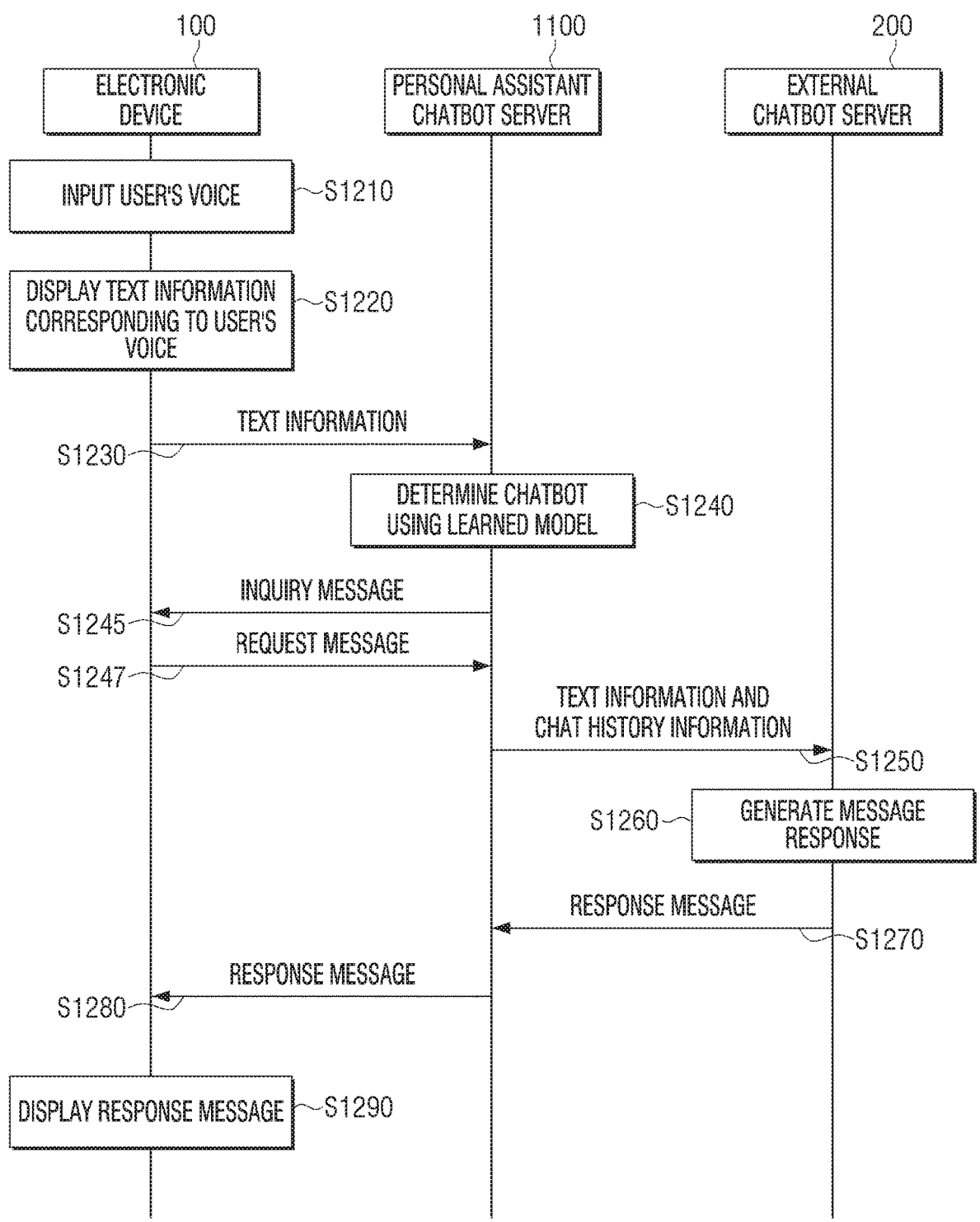
FIG. 12 is a flowchart to describe an embodiment of chanting a chatbot by a personal assistant chatbot according to another embodiment of the disclosure.

FIG. 12 is a flowchart to describe an embodiment of chanting a chatbot by the personal assistant chatbot according to another embodiment of the disclosure.

Referring to FIG. 12, the electronic device 100 may receive a user's voice in operation S1210. The electronic device 100 may acquire text information corresponding to the input user's voice.

The electronic device 100 can display text information corresponding to the user's voice in operation S1220. The electronic device 100 can display the text information on the chat screen for chatting with the personal assistant chatbot.

The electronic device 100 may transmit the text information to the personal assistant chatbot server 1100 in operation S1230.

The personal assistant chatbot server 1100 can determine a chatbot that can provide a response regarding the user's voice using the learned model in operation S1240. Specifically, the personal assistant chatbot server 1100 may provide a response message regarding the user's voice using a chatbot determination model that is learned to determine the chatbot for providing a response message by using the text information and the chat history information as input data.

The personal assistant chatbot server 1100 can determine a chatbot provided by an external chatbot server as a chatbot that can provide a response message, and can determine a personal assistant chatbot as a chatbot that can provide a response message.

The personal assistant chatbot server 1100 may transmit an inquiry message to the electronic device 100 in operation S1245. The inquiry message may be a message inquiring whether to transmit the response message to the external chatbot server.

The electronic device 100 may transmit the request message in response to the inquiry message to the personal assistant chatbot server 1100 in operation S1247.

The personal assistant chatbot server 1100 may transmit the text information and the chat history information to the chatbot server 200 providing the determined chatbot in response to the request message in operation S1250. The personal assistant chatbot server 1100 can generate an inquiry message including text information and chat history information based on the structure information of the chatbot registered in the personal assistant chatbot server 1100, and transmit the inquiry message to the external chatbot server 200. The inquiry message generated herein may be an inquiry message generated according to the information transmission standard existing between the personal assistant chatbot server 1100 and the external chatbot server 200. In addition, the personal assistant chatbot server 1100 can transmit the context information together with the text information and the chat history information to the external chat server 200.

The external chatbot server 200 may generate a response message in operation S1260. The response message is a message to provide a reply to the inquiry message and may be generated according to the information transmission standard that exists between the personal assistant chatbot server 1100 and the external chatbot server 200.

The external chatbot server 200 may transmit the generated response message to the personal assistant chatbot server 1100 in operation in operation S1270 and the personal assistant chatbot server 1100 may transmit the response message to the electronic device 100 in operation S1280. T, the personal assistant chatbot server 1100 can update the chat history information by storing the response message and also display the response message in operation S1290.

The electronic device 100 may display a response message on a chat screen for performing chatting with the personal assistant chatbot.

Figure 13:
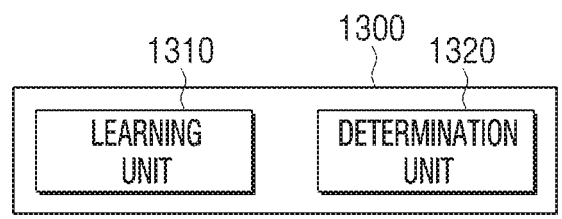
FIG. 13 is a block diagram illustrating a configuration of an electronic device to learn and use a model for determining a chatbot according to an embodiment of the disclosure.

FIG. 13 is a block diagram illustrating a configuration of an electronic device to learn and use a model for determining a chatbot according to an embodiment of the disclosure.

Referring to FIG. 13, a processor 1300 may include at least one of a learning unit 1310 and a determination unit 1320. The processor 1300 of FIG. 13 may correspond to the processor 150 of the electronic device 100 or the processor of the data learning server (not shown).

The learning unit 1310 may generate or train a determination model having a criteria for determining a chatbot for providing a response message using learning data. The learning unit 1310 may generate a determination model having a determination criteria using the collected learning data.

For example, the learning unit 1310 can determine the domain of the chatbot using the function and attribute information of the registered external chatbot as learning data. The learning unit 1310 may generate, learn, or update a chatbot determination model for providing a response message using text information and chat history information as learning data based on the domain of the chatbot.

The determination unit 1320 may estimate a chatbot providing a response message regarding a predetermined user's voice using the predetermined data as input data for the learned determination model.

As one example, the determination unit 1320 may determine (or estimate, deduct) a chatbot providing a response message for user's voice by using the text information and chat history information as input data for the learned chatbot determination model.

At least a portion of the learning unit 1310 and at least a portion of the determination unit 1320 may be implemented in a software module or in the form of at least one hardware chip and mounted in an electronic device. For example, at least one of the learning unit 1310 and the determination unit 1320 may be fabricated in the form of a dedicated hardware chip for artificial intelligence (AI), or a general-purpose processor (e.g., a CPU or an application processor or a graphics-only processor (e.g., a GPU) and may be mounted on various electronic devices as described above. The dedicated hardware chip for artificial intelligence is dedicated processor for probability calculation, and it has higher parallel processing performance than existing general purpose processor, so it can quickly process computation tasks in artificial intelligence such as machine learning. When the learning unit 1310 and the determination unit 1320 are implemented with a software module (or a program module including an instruction), the software module may be a non-transitory computer readable media. In this case, the software module may be provided by an operating system (OS) or by a predetermined application. Alternatively, some of the software modules may be provided by an OS, and some of the software modules may be provided by a predetermined application.

In this case, the learning unit 1310 and the determination unit 1320 may be mounted on one electronic device or on separate electronic devices, respectively. For example, one of the learning unit 1310 and the determination unit 1320 may be included in the electronic device 100, and the other one may be included in an external server. The learning unit 1310 and the determination unit 1320 may provide the model information constructed by the learning unit 1310 to the determination unit 1320 via the wired or wireless communication system, and data which is input to the determination unit 1320 may be provided to the learning unit 1310 as additional learning data.

Figure 14A:
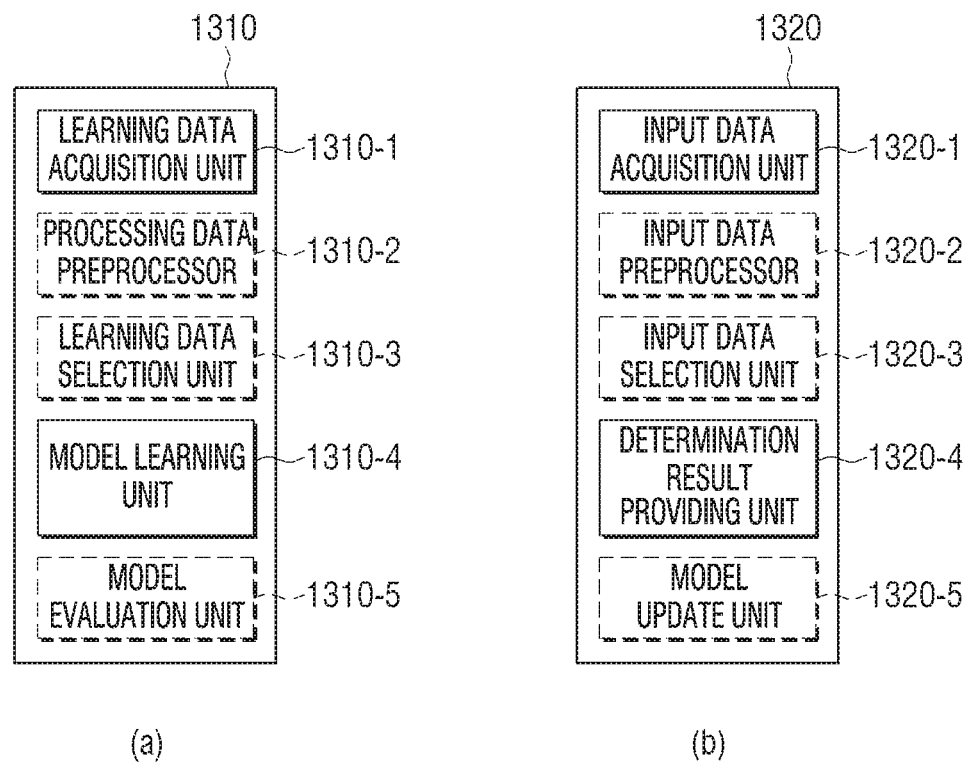
FIGS. 14A and 14B are block diagrams illustrating a specific configuration of a learning unit and a determination unit according to an embodiment of the disclosure.

FIG. 14A is a block diagram illustrating a learning unit and a determination unit according to various embodiments of the disclosure.

Referring to FIG. 14A, in panel (a) the learning unit 1310 according to some embodiments may include a learning data acquisition unit 1310-1 and a model learning unit 1310-4. The learning unit 1310 may further include at least one of the learning data preprocessor 1310-2, the learning data selection unit 1310-3, and the model evaluation unit 1310-5 selectively.

The learning data acquisition unit 1310-1 can acquire learning data necessary for a determination model for determining a chatbot. In the embodiment of the disclosure, the learning data acquisition unit 1310-1 can acquire text information and chat history information (or context information) as learning data. Further, the learning data acquisition unit 1310-1 can acquire, as learning data, functions provided by the chatbot and attribute information necessary for performing functions. The learning data may be data collected or tested by the learning unit 1310 or the manufacturer of the learning unit 1310.

The model learning unit 1310-4 can use the learning data to train that the determination model has a criterion of how to determine a chatbot that can provide a response message regarding the user's voice. For example, the model learning unit 1310-4 can train a determination model through supervised learning using at least some of the learning data as a determination reference. Alternatively, the model learning unit 1310-4 may, for example, train the determination model through unsupervised learning for finding out a determination criteria for determining a situation by learning itself using learning data without specific supervision. Further, the model learning unit 1310-4 may, for example, may train the determination model through a reinforcement learning which uses feedback regarding whether a result of determination of a situation according to learning is correct. In addition, the model learning unit 1310-4 may train the determination model using learning algorithm and so on including error back-propagation or gradient descent.

The model learning unit 1310-4 may learn the selection criteria regarding which learning data needs to be used in order to determine a chatbot providing a response message using the input data.

The model learning unit 1310-4 can determine a determination model having a large relevance between the input learning data and the basic learning data as a determination model to be learned when a plurality of determination models constructed in advance exist. In this case, the basic learning data may be pre-classified according to the data type, and the determination model may be pre-built for each data type. For example, the basic learning data may be pre-classified by various criteria such as an area where the learning data is generated, a time at which the learning data is generated, a size of the learning data, a genre of the learning data, a creator of the learning data, a type of objects within learning data, and so on.

When the determination model is learned, the model learning unit 1310-4 can store the learned determination model. In this case, the model learning unit 1310-4 can store the learned determination model in the memory 140 of the electronic device 100. Alternatively, the model learning unit 1310-4 may store the learned determination model in the memory of the electronic device 100 and a server (e.g., a personal assistant chatbot server 1100) connected via a wired or wireless network.

The learning unit 1310 may further include the learning data preprocessor 1310-2 and the learning data selection unit 1310-3 in order to improve the determination result of the determination model or to save resources or time required for generation of a determination model.

The learning data preprocessor 1310-2 can preprocess the acquired data so that the acquired data can be used for the learning for determining the chatbot. The learning data preprocessor 1310-2 can process the acquired data into a predetermined format so that the model learning unit 1310-4 can use the data acquired for learning for the chatbot determination. For example, the learning data preprocessor 1310-2 can remove text (e.g., adverbs, exclamations, etc.) that is not necessary for the determination model among the inputted text information.

The learning data selection unit 1310-3 can select data acquired by the learning data acquisition unit 1310-1 or data necessary for learning from data preprocessed by the learning data preprocessor 1310-2. The selected learning data may be provided to the model learning unit 1310-4. The learning data selection unit 1310-3 can select the learning data necessary for learning from the acquired or preprocessed data according to a predetermined selection criterion. The learning data selection unit 1310-3 may also select learning data according to a predetermined selection criterion by learning by the model learning unit 1310-4. For example, the learning data selection unit 1310-3 can select the learning data to correspond to the structure information of the chatbot.

The learning unit 1310, in order to improve the determination result of the determination model, may further include the model evaluation unit 1310-5.

The model evaluation unit 1310-5 inputs evaluation data to the determination model, and if the determination result outputted from the evaluation data does not satisfy the predetermined criterion, the model evaluation unit 1310-5 can let the model learning unit 1310-4 learn again. In this case, the evaluation data may be predefined data for evaluating the determination model.

For example, the model evaluation unit 1310-5 may determine that, if the number or ratio of evaluation data of which determination result is not correct exceeds a predetermined threshold value, from among the determination results of the determination model that is learned with respect to the evaluation data, the predetermined criteria is not satisfied.

When there are a plurality of learned determination models, the model evaluation unit 1310-5 may evaluate whether each of the learned determination models satisfies a predetermined criterion, and determine a model satisfying a predetermined criterion as a final determination model. In this case, when there are a plurality of models satisfying the predetermined criterion, the model evaluation unit 1310-5 can determine any one or a predetermined number of models previously set in the descending order of evaluation scores as a final determination model.

In panel (b) of FIG. 14A, the determination unit 1320 according to some embodiments may include the input data acquisition unit 1320-1 and the determination result providing unit 1320-4.

The determination unit 1320 may further include at least one of the input data preprocessor 1320-2, input data selection unit 1320-3, and the model update unit 1320-5.

The input data acquisition unit 1320-1 can acquire the data necessary for determining the chatbot providing the response message. As a result of the determination, the determination result providing unit 1320-4 may determine the chatbot providing the response message by applying the input data obtained from the input data acquisition unit 1320-1 to the learned decision model. As a result of the determination, the determination result providing unit 1320-4 may apply the data selected by the input data preprocessor 1320-2 or the input data selection unit 1320-3, which will be described later. The determination result may be determined by a determination model.

As an embodiment, the determination result providing unit 1320-4 may determine (or estimate) a chatbot which provides a response message by applying the text information and chat history information (e.g., context information, etc.) obtained the input data acquisition unit 1320-1 to the learned determination model.

The determination unit 1320 may further include the input data preprocessor 1320-2 and the input data selection unit 1320-3 in order to improve the determination result of the determination model or save resources or time for providing the determination results.

The input data preprocessor 1320-2 can pre-process the acquired data so that the acquired data can be used for determining the chatbot. The input data preprocessor 1320-2 can process the acquired data into a predefined format so that the determination result providing unit 1320-4 can use the data acquired for the chatbot determination.

The input data selection unit 1320-3 can select the data acquired by the input data acquisition unit 1320-1 or the data necessary for the situation determination among the data preprocessed by the input data preprocessor 1320-2. The selected data may be provided to the determination result providing unit 1320-4 as a determination result. The input data selection unit 1320-3 can select some or all of the obtained or preprocessed data according to a predetermined selection criterion for the situation determination. The input data selection unit 1320-3 can also select data according to a predetermined selection criterion by learning by the model learning unit 1310-4.

The model update unit 1320-5 can control the determination model to be updated based on the evaluation of the determination result provided by the determination result providing unit 1320-4 as a determination result. For example, the model update unit 1320-5 may provide the model learning unit 1310-4 with the determination result provided by the determination result providing unit 1320-4 as a determination result, so that the model learning unit 1310-4 can additionally learn or update the determination model.

Figure 14B:
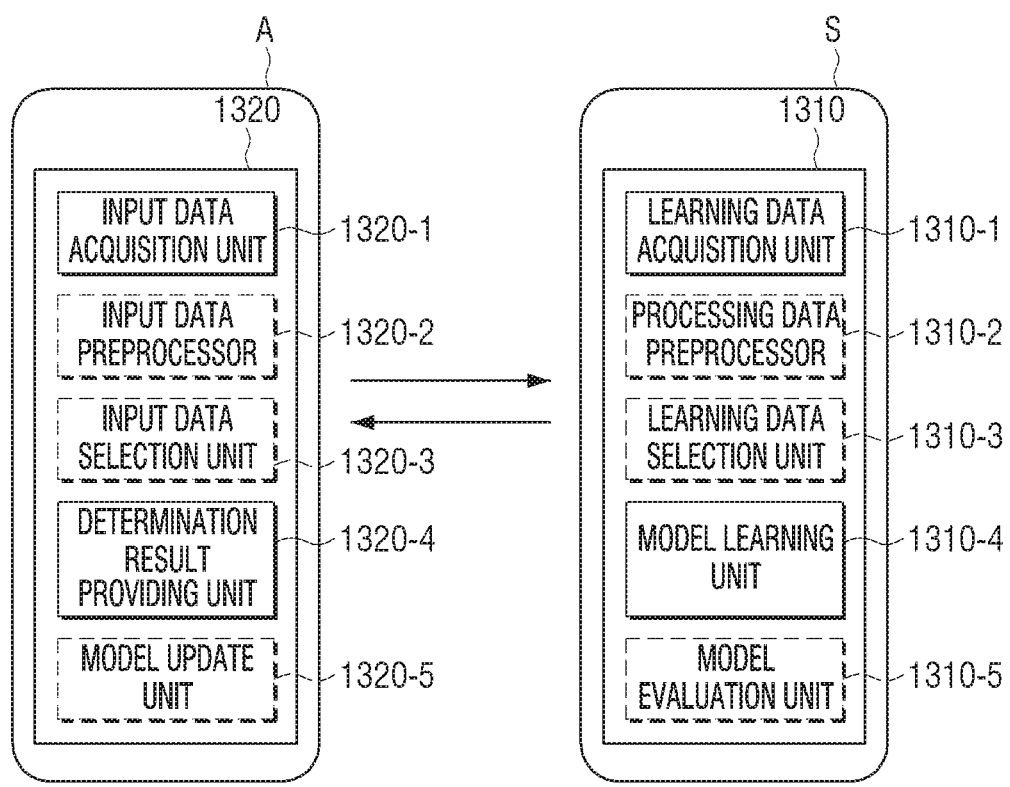

FIG. 14B is a view illustrating an example that an electronic device and an external server are interlocked with each other to learn and determine data according to an embodiment of the disclosure.

Referring to FIG. 14B, an external server (S) may learn the criteria for determining a chatbot for providing a response message, and the electronic device 100 may determine a situation based on a learning result by the external server (S).

In this case, the model learning unit 1310-4 of the external server (S) can perform the function of the learning unit 1310 shown in FIG. 13. The model learning unit 1310-4 of the external server (S) may learn criteria regarding which text information or context information to use in order to determine a chatbot for providing the response message or how to determine the chatbot for providing a response message using the information.

The determination result providing unit 1320-4 of the electronic device 100 may determine a chatbot for providing a response message by applying the data selected by the input data selection unit 1320-3 to the determination model generated by the server (S). Alternatively, the determination result providing unit 1320-4 of the electronic device 100 may receive the determination model generated by the server 50 from the server 50, and determine a chatbot for providing a response message using the received determination model.

Figure 15:
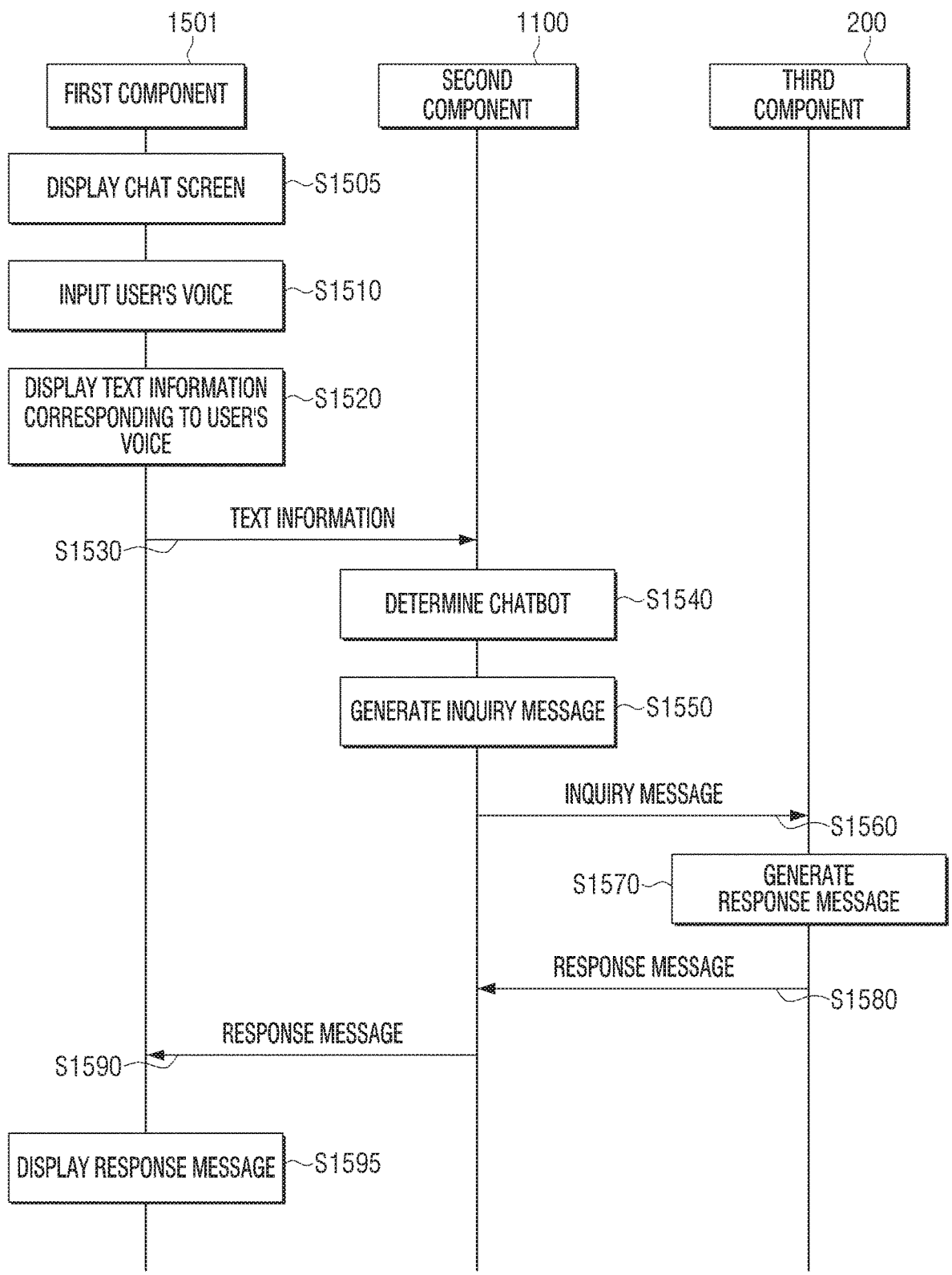
FIG. 15 is a flowchart of network system using a chatbot determination model according to various embodiments of the disclosure.

FIG. 15 is a flowchart of network system using a chatbot determination model according to various embodiments of the disclosure.

Referring to FIG. 15, the network system using the determination model may include a first component 1501 and a second component 1502.

The first component 1501 may be the electronic device 100 and the second component 1502 may be the server (S) storing the determination model. Alternatively, the first component 1501 may be a general purpose processor and the second component 1502 may be an artificial intelligence dedicated processor. Alternatively, the first component 1501 may be at least one application, and the second component 1502 may be an operating system (OS). That is, the second component 1502 may be a component which is more integrated, dedicated, has less delay, has higher performance, or has greater resources than the first component 1501, and can rapidly and effectively process greater computations which are required for generation, update or application of the determination model compared to the first component 1501.

In this case, an interface for transmitting/receiving data between the first component 1501 and the second component 1502 may be defined. For example, an application program interface (API) having learning data to be applied to a determination model as an argument value (or an intermediate value or a transfer value) may be defined. The API is a set of subroutines or functions that can be called for any processing of another protocol (e.g., a protocol defined in server (S)) in any one protocol (e.g., a protocol defined in electronic device 100). That is, an environment in which an operation of another protocol can be performed through any one protocol through an API can be provided.

The third component 1503 may be implemented as a chatbot for providing a response message or a chatbot stored in the electronic device 100.

In FIG. 15, the first component 1501 may display a chat screen in operation S1505. The chat screen can be a screen in which chat is performed with a personal assistant chatbot or another chatbot.

While the chat screen is being displayed, the first component 1501 may receive a user's voice in operation S1510. The first component 1501 may process a user's voice and acquire text information corresponding to the user's voice.

The first component 1501 may display the text information corresponding to the user's voice in operation S1520.

The first component 1501 may transmit the text information to the second component 1502 in operation S1530. At this time, the first component 1501 may transmit various context information (e.g., user profile information, user search information, user preference information, etc.) together to the second component.

The second component 1502 may determine a chatbot capable of providing a response message based on the received text information in operation S1540. Specifically, the second component 1502 can determine the chatbot that provides the response message to the user voice by inputting the context information including the text information and the chat history information into the learned determination model. The learned determination model can be learned to determine a chatbot that provides a response message using text information and context information as input data.

The second component 1502 may generate the inquiry message in operation S1550. The second component 1502 can determine the function corresponding to the user's voice based on the structure information of the determined chatbot. The second component 1502 may then generate an inquiry message containing text information and context information to perform the determined function. In addition, the second component 1502 can generate an inquiry message according to the information transmission specification between the second component 1502 and a third component 1503.

The second component 1502 may transmit the inquiry message to the third component 1503 in operation S1560, and the third component 1503 may generate the response message based on the inquiry message in operation S1570. The third component 1503 may generate a response message according to the information transmission standard between the second component 1502 and the third component 1503.

The third component 1503 may transmit a response message to the second component 1502 in operation S1580, and the second component 1502 may transmit the received response message to the first component 1501 again in operation S1590.

The first component 1501 may display a response message on a chat screen in operation S1595.

According to various embodiments of the disclosure as described above, a user can reduce the irritating task that a user has to specify a chatbot, and can perform conversation with a changed chatbot without interruption of the conversation even if the chatbot is changed.

Various embodiments of the disclosure may be implemented as software including instructions included in the machine (e.g.: computer) readable storage media. The device calls instructions stored in the storage medium and is operable according to the called instructions, and may include an electronic device (e.g.: electronic device 100) according to the disclosed various embodiments. If the instructions are implemented by a processor, the processor may perform a function corresponding to the instructions by the processor itself or using other components under the control of the processor. The instructions may include a code generated or executed by a compiler or interpreter. A machine-readable storage medium can be provided in a format of a non-transitory storage medium. The "non-transitory" indicates that the storage medium does not include a signal and is tangible, but does not distinguish that the data is stored in the storage medium semi-permanently or temporarily.

According to an embodiment, the method according to various embodiments disclosed herein may be provided in a computer program product. A computer program product may be traded between a seller and a purchaser as a commodity. A computer program product may be distributed in the form of a machine-readable storage medium (e.g.: compact disc read only memory (CD-ROM)) or distributed online through an application store (e.g.: PlayStore™). In the case of online distribution, at least a portion of the computer program product may be stored temporarily or at least temporarily in a storage medium such as a manufacturer's server, a server of an application store, or a memory of a relay server.

Each of the components (e.g., module or program) according to various embodiments may be comprised of a single entity or a plurality of entities, and some subcomponents of the previously mentioned subcomponents may be omitted, or other subcomponents May be further included in various embodiments. Alternatively or additionally, some components (e.g., modules or programs) may be integrated into one entity to perform the same or similar functions performed by each respective component prior to integration. Operations performed by a module, program, or other component, in accordance with various embodiments, may be performed sequentially, in a parallel, repetitive, or heuristically manner, or at least some operations may be performed in a different order.

The non-transitory computer readable medium refers to a medium that stores data semi-permanently, and is readable by an apparatus. Specifically, the above-described various applications or programs may be stored in the non-transitory computer readable medium such as a compact disc (CD), a digital versatile disc (DVD), a hard disk, a Blu-ray disk, a universal serial bus (USB), a memory card, a ROM or etc., and may be provided.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A controlling method of an electronic device for determining a virtual assistant model among a plurality of virtual assistant models, the method comprising:
   obtaining information regarding a command input by a user;
   processing the obtained information regarding the command and obtaining text information corresponding to the obtained information, and displaying the text information on a chat screen for chatting with a first virtual assistant model;
   determining that the text information includes text information for performing a function within the electronic device;
   in response to the text information not including the text information for performing the function within the electronic device, determining a second virtual assistant model for providing a response message regarding the command, among a plurality of virtual assistant models, by inputting the text information, a chat history information regarding the chat screen, and context information on the user into a chatbot determination model including a neural network model trained to determine a virtual assistant model;
   transmitting the text information, the chat history information, and the context information, to a server corresponding to the determined second virtual assistant model;
   receiving a response message corresponding to the command from the server and providing the response message;
   in response to an event for registering a new virtual assistant model being detected, acquiring meta information of the new virtual assistant model;
   acquiring information on the new virtual assistant model based on the meta information, the information on the new virtual assistant model including a function provided by the new virtual assistant model; and
   storing the information on the new virtual assistant model.

2. The controlling method as claimed in claim 1, the method further comprising:
   in response to the event for registering the new virtual assistant model occurring, acquiring structure information of the new virtual assistant model; and
   registering the new virtual assistant model and the structure information together.

3. The controlling method as claimed in claim 2, wherein the acquiring of the structure information comprises:
   in response to the structure information not being identified through the meta information of the new virtual assistant model, transmitting an inquiry message for inquiring structure information of the new virtual assistant model to a server for providing the new virtual assistant model;
   receiving a response message regarding the inquiry message; and
   generating structure information of the new virtual assistant model based on the response message.

4. The controlling method as claimed in claim 1, further comprising:
   determining one of functions provided by the second virtual assistant model based on structure information of the second virtual assistant model.

5. The controlling method as claimed in claim 1, further comprising:
   in response to the text information including the information for performing the function within the electronic device, displaying a response message regarding the command by the first virtual assistant model.

6. The controlling method as claimed in claim 5, wherein the transmitting of the text information, the chat history information, and the context information comprises transmitting the text information, the chat history information, and the context information based on information transmission standards between a server providing the first virtual assistant model and the server providing the second virtual assistant model.

7. The controlling method as claimed in claim 1, wherein the providing of the response message comprises displaying the response message along with an icon corresponding to the second virtual assistant model.

8. The controlling method as claimed in claim 1, wherein the context information on the user comprises profile information of the user and search information of the user.

9. An electronic device comprising:
   a display;
   a user inputter;
   a communicator;
   at least one processor electrically connected to the display, the user inputter, and the communicator; and
   a memory electrically connected to the at least one processor,
   wherein the at least one processor is configured to:
      obtain information regarding a command input by a user, process the obtained information regarding the command and obtain text information corresponding to the obtained information, control the display to display the text information regarding the command on a chat screen for chatting with a first virtual assistant model, determine that the text information includes text information for performing a function within the electronic device, in response to the text information not including the text information for performing the function within the electronic device, determine a second virtual assistant model for providing a response message regarding the command, among a plurality of virtual assistant models, by inputting the text information, a chat history information regarding the chat screen, and context information on the user into a chatbot determination model including a neural network model trained to determine a virtual assistant model, control the communicator to transmit the text information, the chat history information, and the context information regarding the command, to a server corresponding to the determined second virtual assistant model, control the display to receive a response message corresponding to the command from the server and provide the response message, in response to an event for registering a new virtual assistant model being detected, acquire meta information of the new virtual assistant model, acquire information on the new virtual assistant model based on the meta information, the information on the new virtual assistant model including a function provided by the new virtual assistant model, and store the information on the new virtual assistant model.

10. The electronic device as claimed in claim 9, wherein the at least one processor, in response to the event for registering the new virtual assistant model occurring, is further configured to acquire structure information of the new virtual assistant model and register the new virtual assistant model and the structure information together.

11. The electronic device as claimed in claim 10, wherein the at least one processor, in response to the structure information not being identified through the meta information of the new virtual assistant model, is further configured to:

control the communicator to transmit an inquiry message for inquiring the structure information of the new virtual assistant model to a server providing the new virtual assistant model, receive a response message regarding the inquiry message through the communicator, and generate structure information of the new virtual assistant model based on the response message.

12. The electronic device as claimed in claim 9, wherein the at least one processor is further configured to:

determine one of functions provided by the second virtual assistant model based on structure information of the second virtual assistant model.

13. The electronic device as claimed in claim 9, wherein the at least one processor, in response to the text information being the text information for performing the function within the electronic device, is further configured to control the display to display a response message regarding the command by the first virtual assistant model.

14. The electronic device as claimed in claim 13, wherein the at least one processor is further configured to control the communicator to transmit the text information, the chat history information, and the context information based on an information transmission standard between a server providing the first virtual assistant model and the server providing the second virtual assistant model.

15. The electronic device as claimed in claim 9, wherein the at least one processor is further configured to control the display to display the response message along with an icon corresponding to the second virtual assistant model.

16. The electronic device as claimed in claim 9, wherein the context information on the user comprises profile information of the user and search information of the user.

* * * * *